United States Patent
Robinson et al.

(10) Patent No.: US 11,220,301 B2
(45) Date of Patent: Jan. 11, 2022

(54) MULTI-POSITION TAILGATE FOR A VEHICLE

(71) Applicant: Rivian IP Holdings, LLC, Plymouth, MI (US)

(72) Inventors: William Kirk Robinson, Ann Arbor, MI (US); Sheetanshu Tyagi, Ann Arbor, MI (US); Mark Vinnels, Plymouth, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 73 days.

(21) Appl. No.: 16/682,211

(22) Filed: Nov. 13, 2019

(65) Prior Publication Data

US 2020/0148283 A1    May 14, 2020

Related U.S. Application Data

(60) Provisional application No. 62/760,917, filed on Nov. 13, 2018.

(51) Int. Cl.
*B62D 33/03* (2006.01)
*B62D 33/037* (2006.01)
*B62D 33/027* (2006.01)

(52) U.S. Cl.
CPC ....... *B62D 33/037* (2013.01); *B62D 33/0273* (2013.01); *B62D 33/03* (2013.01)

(58) Field of Classification Search
CPC .. B62D 33/03; B62D 33/0273; B62D 33/027; B62D 33/023; B60J 5/108

USPC .................................................. 296/57.1, 62
See application file for complete search history.

(56) References Cited

U.S. PATENT DOCUMENTS

| | | | | |
|---|---|---|---|---|
| 5,732,996 A * | 3/1998 | Graffy | ...................... | B60R 3/02 280/166 |
| 5,820,193 A * | 10/1998 | Straffon | ..................... | B60R 3/02 296/62 |
| 5,904,391 A * | 5/1999 | Liljenquest | ........ | B62D 33/0273 296/57.1 |
| 6,874,838 B2 * | 4/2005 | De Gaillard | .......... | B60P 1/4414 296/51 |
| 6,941,655 B1 * | 9/2005 | Bisland | .................... | B25H 1/04 182/186.5 |
| 2001/0004155 A1 * | 6/2001 | Decker | ...................... | B60J 5/12 296/57.1 |
| 2002/0074818 A1 * | 6/2002 | Presley | .............. | B62D 33/0273 296/57.1 |

(Continued)

Primary Examiner — Gregory A Blankenship
(74) Attorney, Agent, or Firm — Haley Guiliano LLP

(57) ABSTRACT

A tailgate assembly of a vehicle includes a tailgate configured to provide a boundary of a cargo area, and a hinge assembly coupled to the tailgate and coupled to the vehicle. The hinge assembly is configured to control a trajectory of the tailgate. The tailgate is configured to achieve a vertical closed position, a horizontal open position, and a vertical open position rotated about 180° from the first position. The hinge assembly includes a hinge arm coupled to the vehicle at a first hinge and coupled to the tailgate at a second hinge. In some embodiments, a cable assembly is used to control the position of the tailgate. In the vertical closed position, the cable end is not engaged. In the horizontal open position, the cable end is engaged. In the vertical open position rotated about 180° from the closed position, the cable end is not engaged or under tension.

25 Claims, 26 Drawing Sheets

(56) References Cited

U.S. PATENT DOCUMENTS

| | | | |
|---|---|---|---|
| 2010/0207415 A1* | 8/2010 | King | B62D 33/0273 296/62 |
| 2011/0163565 A1* | 7/2011 | Zielinsky | B62D 33/0273 296/57.1 |
| 2012/0126564 A1* | 5/2012 | Hausler | B62D 33/0273 296/62 |
| 2015/0314813 A1* | 11/2015 | Waskie | B62D 33/0273 296/57.1 |
| 2015/0344082 A1* | 12/2015 | Keklak | B60R 13/06 16/250 |
| 2016/0075286 A1* | 3/2016 | Butlin, Jr. | B62D 33/03 296/62 |
| 2016/0101817 A1* | 4/2016 | Krishnan | B60R 3/02 296/62 |
| 2016/0160553 A1* | 6/2016 | Nania | B62D 33/0273 296/50 |
| 2017/0106921 A1* | 4/2017 | Norfleet | B62D 33/027 |
| 2018/0195332 A1* | 7/2018 | Martins | E05F 5/06 |
| 2019/0375467 A1* | 12/2019 | Tyagi | B62D 33/03 |
| 2020/0239085 A1* | 7/2020 | Watson | B62D 33/0273 |
| 2021/0016844 A1* | 1/2021 | Ogden | B62D 33/037 |
| 2021/0171128 A1* | 6/2021 | Stojkovic | B60J 5/108 |

\* cited by examiner

MULTI-POSITION TAILGATE FOR A VEHICLE

CROSS REFERENCE TO RELATED APPLICATION

This application claims the benefit of U.S. Provisional Patent Application No. 62/760,917, filed Nov. 13, 2018, the disclosure of which is hereby incorporated by reference herein in its entirety.

INTRODUCTION

The present disclosure is directed towards a multi-position tailgate for a vehicle, and more particularly towards a tailgate and mechanism for achieving tailgate positions.

SUMMARY

Vehicle tailgates typically open using a single trajectory to allow access to the rear cargo area. For example, a truck tailgate typically drops down by rotating about a hinge to allow access to the truck bed. The dropped tailgate allows a user to increase horizontal work space, storage space, or provide a platform for climbing into the bed. One drawback to this motion is that the tailgate now protrudes rearward of the vehicle, blocking the user from standing closer to the vehicle bed. It would be desirable for a tailgate to be capable of achieving more than one lowered position. It would also be desirable for a tailgate to provide additional increased horizontal work space. It would also be desirable for a tailgate to provide increased access to the bed.

The present disclosure is directed to a tailgate assembly of a vehicle. The tailgate assembly includes a tailgate and a hinge assembly. The tailgate is configured to provide a boundary of a cargo area. The hinge assembly is coupled to the tailgate and coupled to the vehicle, and is configured to control a trajectory of the tailgate relative to the vehicle. The tailgate is configured to achieve a first position, wherein the first position is a vertical closed position. The tailgate is configured to achieve a second position, wherein the second position is a horizontal open position. The tailgate is configured to achieve a third position, wherein the third position is a vertical open position rotated about 180° from the first position.

In some embodiments, the hinge assembly includes a hinge arm. The hinge arm is coupled to the vehicle at a first hinge and the hinge arm is coupled to the tailgate at a second hinge. In some embodiments, the hinge arm is arranged at a first angle when the tailgate achieves the first position, and arranged at a second angle when the tailgate achieves the second position. In some embodiments, the hinge arm is also arranged at the second angle when the tailgate achieves the third position. In some embodiments, when the hinge arm is arranged at the second angle and the tailgate is arranged in the third position, the hinge arm extends from the vehicle by a distance less than a height of the tailgate. In some embodiments, the tailgate assembly includes a latching mechanism configured to constrain at least one motion of the tailgate assembly.

In some embodiments, the tailgate assembly includes a winch assembly. The winch assembly includes a winch mechanism and a cable coupled to the winch mechanism and coupled to the tailgate. The winch mechanism is configured to wind and unwind the cable when the tailgate changes position. In some embodiments, the winch mechanism includes an angle detent configured to define one or more positions of the tailgate.

In some embodiments, when in the second position, the tailgate is substantially horizontally oriented at about 90° to vertical, and when in the third position, the tailgate is substantially vertically oriented and relatively upside down as compared to the first position.

In some embodiments, the tailgate assembly includes a latching mechanism configured to constrain at least one motion of the tailgate assembly. For example, the latching mechanism is configured to, when latched, constrain the tailgate to remain in the first position. In a further example, the latching mechanism is configured to, when latched, constrain the tailgate to remain in the second position. In a further example, the latching mechanism is configured to, when latched, constrain the tailgate to remain in the third position.

In some embodiments, the latching mechanism is configured to, when latched, constrain the hinge arm to remain at the first angle. In some embodiments, the latching mechanism is configured to, when latched, constrain the hinge arm to remain at the second angle.

In some embodiments, the tailgate assembly includes a cover plate coupled to the vehicle by a cover plate hinge. In some such embodiments, when the tailgate achieves the first position, the cover plate is oriented nearly vertical against the tailgate. In some such embodiments, when the tailgate achieves the second position, the cover plate is oriented nearly horizontal arranged above the hinge assembly. In some such embodiments, when the tailgate achieves the third position, the cover plate is oriented nearly horizontal arranged above the hinge assembly.

In some embodiments, the present disclosure is directed to a tailgate assembly of a vehicle having a horizontal stepping surface. The tailgate assembly includes a tailgate configured to provide a boundary of a cargo area, a step coupled to the tailgate by a step hinge, and a hinge assembly coupled to the tailgate and coupled to the vehicle, and configured to control a trajectory of the tailgate relative to the vehicle. In some such embodiments, the tailgate is configured to achieve a first position, wherein the first position is a closed position. In some such embodiments, the tailgate is configured to achieve a second position about 90° from the first position. In some such embodiments, the tailgate is configured to achieve a third position rotated about 180° from the first position, wherein the step is configured to rotate relative to the tailgate about the step hinge to provide a horizontal stepping surface when the tailgate is in the third position.

In some embodiments, when the tailgate achieves the first position, the step is arranged parallel to the tailgate. In some such embodiments, the tailgate assembly includes a step latch configured to constrain the step against the tailgate. In some such embodiments, the step latch, when released, allows the step to rotate 90° relative to the tailgate to provide a substantially perpendicular surface relative to the tailgate.

In some embodiments, the step is configured to move based on a gravitational force and is constrained to rotate about the step hinge based on the gravitational force.

In some embodiments, the present disclosure is directed to a tailgate assembly of a vehicle having a cable assembly. The tailgate assembly includes a tailgate configured to provide a boundary of a cargo area, a hinge assembly, and a cable assembly. The hinge assembly is coupled to the tailgate and to the vehicle, and is configured to control a trajectory of the tailgate relative to the vehicle. The cable assembly couples the tailgate to the vehicle. The tailgate is configured to achieve a first position, wherein the first position is a vertical closed position. The tailgate is configured to achieve a second position, wherein the second position is a horizontal open position in which the tailgate causes the cable assembly to be in tension. The tailgate is configured to achieve a third position, wherein the third position is a vertical open position rotated about 180° from the first position, and wherein the tailgate does not impart a tension on the cable assembly.

In some embodiments, the cable assembly includes a locking mechanism, a cable, a first cable end coupled to the tailgate, and a second cable end configured to be coupled to the locking mechanism. In some such embodiments, when the tailgate achieves the first position, the cable is not tensioned. Further, in some such embodiments, when the tailgate achieves the second position, the cable is coupled to the locking mechanism in tension to hold the tailgate against gravity. Further, in some such embodiments, when the tailgate achieves the third position, the cable is released from the locking mechanism and is not in tension.

In some embodiments, the cable assembly includes a cable stop affixed to the cable, wherein the locking mechanism is configured to engage with the cable stop when the tailgate achieves the second position.

In some embodiments, the cable assembly includes a locking mechanism arranged as part of the tailgate, a cable, a first cable end coupled to the vehicle, and a second cable end configured to be coupled to the locking mechanism.

In some embodiments, the present disclosure is directed to a tailgate assembly of a vehicle having a cable mechanism. The tailgate assembly includes a tailgate configured to provide a boundary of a cargo area and including a cable mechanism, a hinge assembly, and a cable assembly. The hinge assembly is coupled to the tailgate and to the vehicle, and is configured to control a trajectory of the tailgate relative to the vehicle. The cable assembly includes a cable and a cable end. The tailgate is configured to achieve a first position, wherein the first position is a vertical closed position, and wherein the cable end is not engaged with the cable mechanism. The tailgate is further configured to achieve a second position, wherein the second position is a horizontal open position, wherein the cable end is engaged with the cable mechanism, and wherein the tailgate causes the cable assembly to be in tension. The tailgate is further configured to achieve a third position, wherein the third position is a vertical open position rotated about 180° from the first position, wherein the cable end is not engaged with the cable mechanism, and wherein the tailgate does not impart a tension on the cable assembly.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Figure 1:
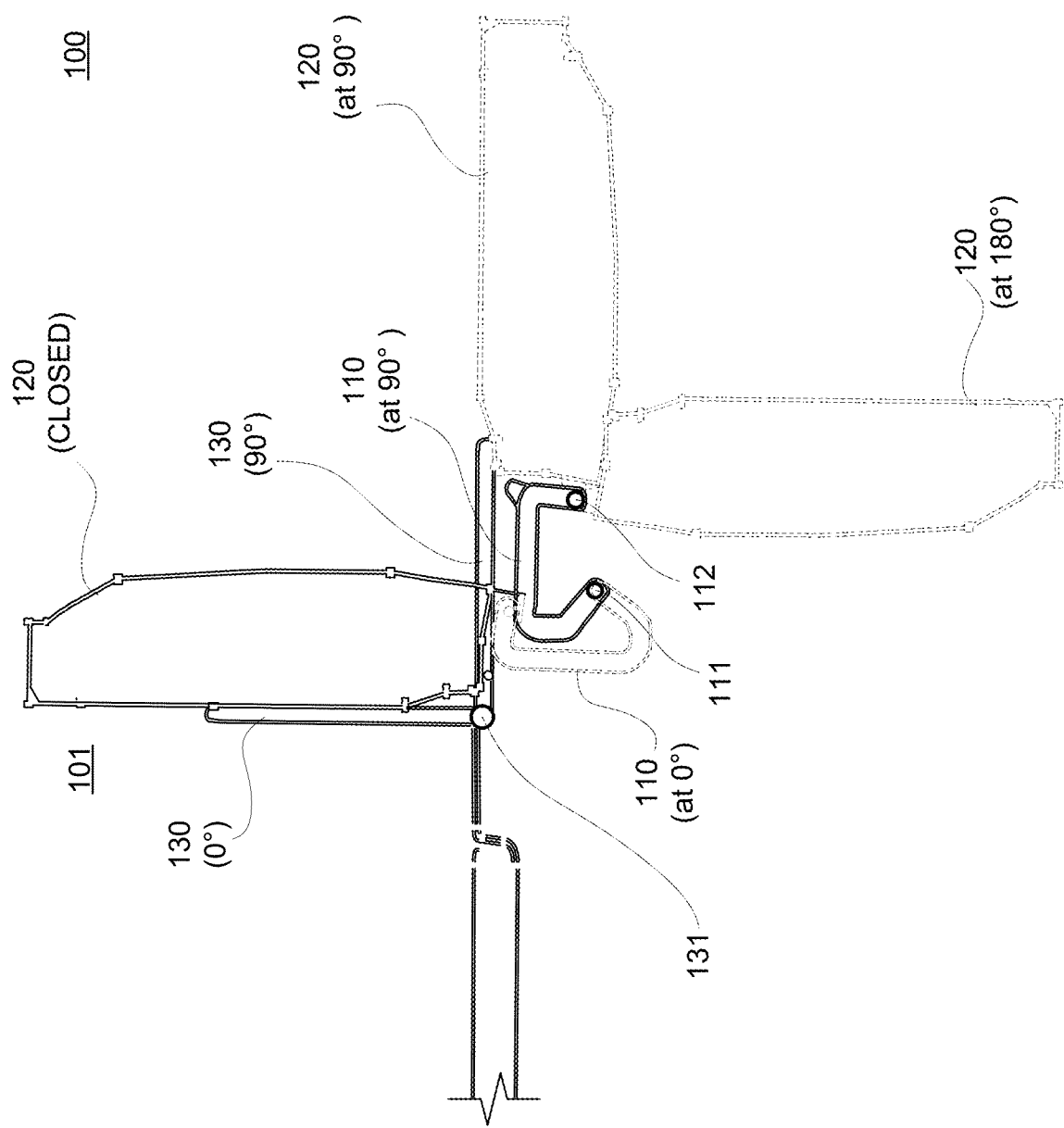
FIG. 1 shows a side cross-sectional side view of a portion of an illustrative vehicle having a tailgate, in accordance with some embodiments of the present disclosure.

In some embodiments, the present disclosure is directed to a tailgate having a fully lowered position. For example, in some embodiments, the tailgate drops down near 90° to a first position but can also drop down fully (e.g., near 180°). The fully dropped position may allow, for example, a user to access a cargo bed of the vehicle more easily. For example, the tailgate may include hinges which allow a dual pivot action.

In some embodiments, a vehicle includes a tailgate assembly having a hinge assembly. The tailgate assembly may include, for example, a primary hinge, a secondary hinge, an assist system, a support cable system, any other suitable components, or any combination thereof. For example, the tailgate assembly may include a gooseneck-type arm coupled to the vehicle at a primary hinge (e.g., for extended bed length when the tailgate is open at 90°) to maintain visually hidden hinges. In a further example, the tailgate assembly may include a secondary hinge to allow the tailgate to achieve 180° of rotation relative to the vehicle. In a further example, the tailgate assembly may include a self-starting lift assist system, a dampening system, or both, that include springs, air springs/pneumatic cylinders, linear or rotary dampeners, or a combination thereof. In a further example, the tailgate assembly may include a support cable retracting winch configured to stop and hold load acting on the tailgate at different angles. For example, in some embodiments, the tailgate system may also include linear and/or rotary actuators to provide a fully powered 180° range tailgate.

In an illustrative example, a primary hinge allows the tailgate to travel to a 90° position (e.g., rotated from closed to a horizontal position). In some embodiments, the open and close motions of the tailgate from 0-90° may be fully hands-free (e.g., actuated and controlled by control circuitry) such that a user can open the gate at the touch of a button. In some embodiments, the system may include a torsion spring, gas strut, or other component to ease actuator load. For example, the motion from 0-90° and from 90-0° may be fully powered, while still allowing manual intervention and obstacle detection. In some embodiments, the tailgate gate is held at the 90° position with the help of a winch assembly. For example, the tailgate may be connected to the winch assembly using a spooled cable which is fixed to the tailgate and the winch. When the winch locks itself in place, the cable is in tension and thus can support some loads on the tailgate.

A winch system, coupled to a cable and locking mechanism, may be configured to hold the tailgate in any suitable position at any point in its motion. For example, the winch may include internal grooves that allow the external grooves on grooved sliders mounted on an internal base plate to lock into it. Motion of the base plate may be controlled by a solenoid which receives signal from a position sensor (e.g., included in control circuitry) and, when the gate approaches 90°, locks the tailgate in place. The winch may be used to lock the tailgate at any point along its travel (e.g., to act as an extended cargo bed floor). In some embodiments, the winch may be configured to be the point of application of power for the tailgate (e.g., to allow a fully-powered open or close motion).

In an illustrative example, the tailgate system may include a secondary hinge configured to allow the tailgate to travel to a 180° position (fully dropped). In some embodiments, the open and close motions of the gate from 0-180° may be fully hands-free such that a user can open the gate at the touch of a button (e.g., using an actuator controlled by control circuitry). For example, motion from 0-180° and from 180-0° may be fully-powered, while still allowing manual intervention and obstacle detection. In some embodiments, the tailgate is held at the 180° position using the winch assembly cables and includes bump stops which allow the gate outer to contact the rear fascia of the vehicle.

In some embodiments, the tailgate assembly may include components to allow the tailgate to achieve weightless operation. For example, such a tailgate may behave as it would in the absence of gravity, by using air springs (e.g., or any other suitable component) that counteract the rotational moment caused by gravity. In some embodiments, the tailgate may be configured to rotate between 0° and 180° with reduced effort (e.g., mechanical work or force) required by a user or actuator. Accordingly, the tailgate may be positioned in any suitable position and held in place with relatively less force (e.g., as compared to having to counteract gravitational forces).

In some embodiments, a tailgate capable of rotating to 90 and 180° may allow an increased effective bed length (e.g., in the 90° position) compared to conventional tailgates.

FIG. 1 shows a side cross-sectional side view of a portion of illustrative vehicle 100 having tailgate 120, in accordance with some embodiments of the present disclosure. Three tailgate positions are illustrated in FIG. 1; closed (0°), dropped to 90°, and dropped to 180°. In the closed position, tailgate 120 is vertical or nearly vertical, and hinge arm 110 is in a first position. In rotating from the 0° position to the dropped to 90° position, tailgate 120 and hinge arm 110 rotate as a rigid body about first hinge 111. The dropped to 90° position provides an extension of the cargo bed as well as allowing for access to the bed without reaching over the tailgate. In rotating from the 90° position to the 180° position, hinge arm 110 remains stationary, while tailgate 120 rotates a further 90° about second hinge 112 to achieve a second vertical position (upside-down relative to the first vertical position in the closed position). The dropped to 180° position provides access to cargo bed 101 without requiring a user to reach over tailgate 120 or be positioned a tailgate's length away from cargo bed 101. In a conventional single-hinge tailgate, the longer the gate, the further back a user must be positioned to access the bed when the tailgate is dropped. Tailgate 120 of FIG. 1 may be relatively longer, because it can be further dropped to 180° when bed access is desired (e.g., to access a cargo box or other feature in cargo bed 101). Although not shown in FIG. 1, further components such as, for example, bump stops, cables, latches, cinches (e.g., at or near the ends of travel), actuators, springs, winches, detents (e.g., ratchet mechanisms), any other suitable components, or any combination thereof, may be included to control, limit, power, smooth, dampen, or otherwise affect motion and position of tailgate 120. In some embodiments, as illustrated, the tailgate assembly includes cover plate 130 coupled to the rest of vehicle 100 by cover plate hinge 131. Because first hinge joint 111 (e.g., between hinge arm 110 and the vehicle frame) is arranged below cargo bed 101, tailgate 120 is able to drop down further away from cargo bed 120 as would be possible if first hinge 111 were higher up near cargo bed 101.

Figure 2:
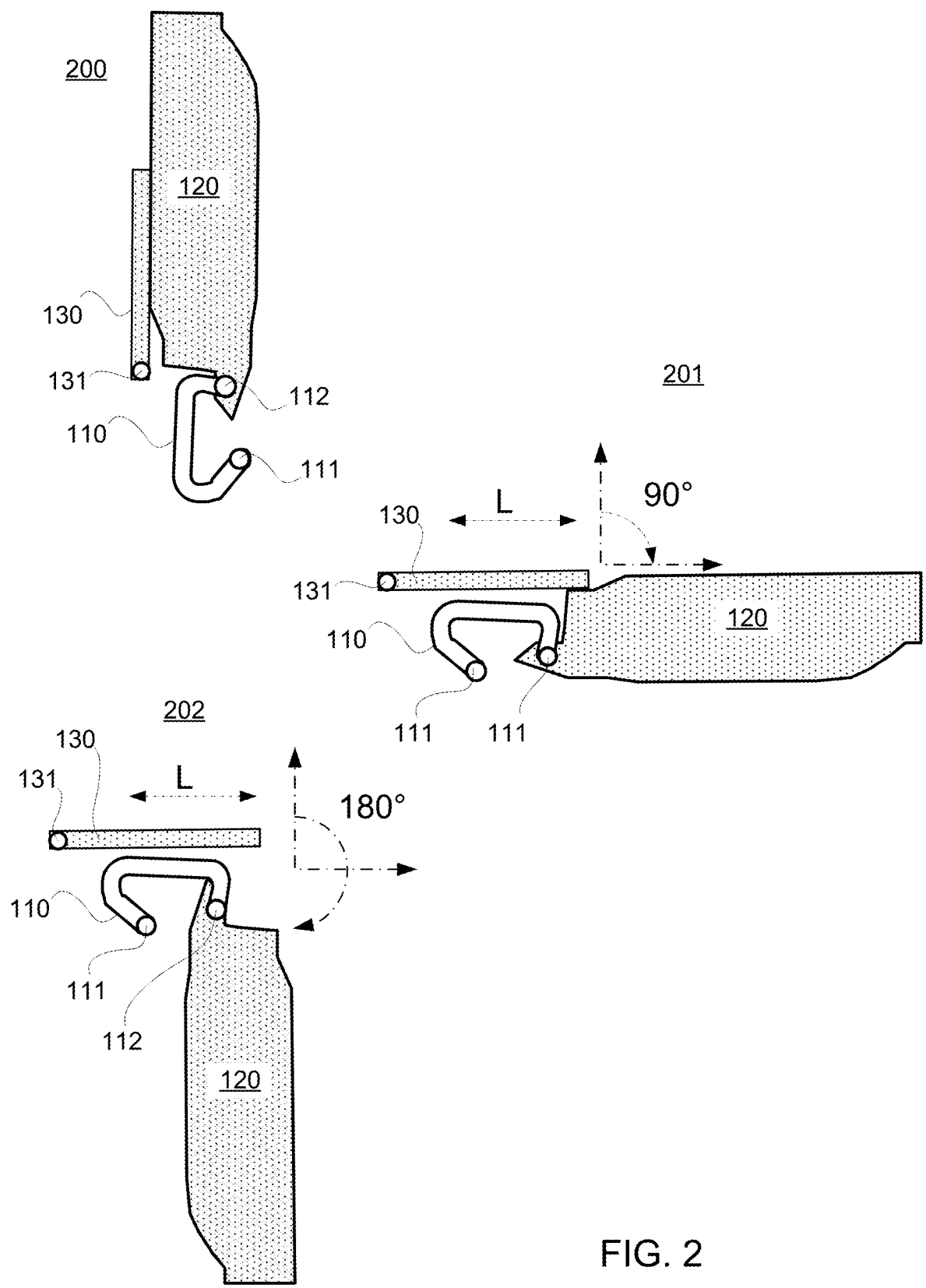
FIG. 2 shows the illustrative three tailgate positions of FIG. 1, separated for clarity, in accordance with some embodiments of the present disclosure.

FIG. 2 shows the illustrative three positions 200, 201, and 202 of tailgate 120 of FIG. 1, separated for clarity, in accordance with some embodiments of the present disclosure. The length L shown in FIG. 2 represents an increased length of cargo bed 101 in the 90° position (position 201) as well as the extended length of cargo bed 101 when tailgate 120 is fully dropped to 180° (position 202). The cover plate is configured to rotate about cover plate hinge 131 to cover hinge arm 110 when tailgate 120 is lowered (e.g., to the 90° and 180° positions). It will be understood that, because more than one hinge may be used, the terms 90° and 180° shall refer to the relative orientation of tailgate 120 as compared to its orientation in the closed position (position 200), and not a strict angular measurement about a fixed point (i.e., pure rotation). In some embodiments, the rotation axis guide shown in FIG. 2 is included to help define the range of motion of the hinge arm.

Figure 3:
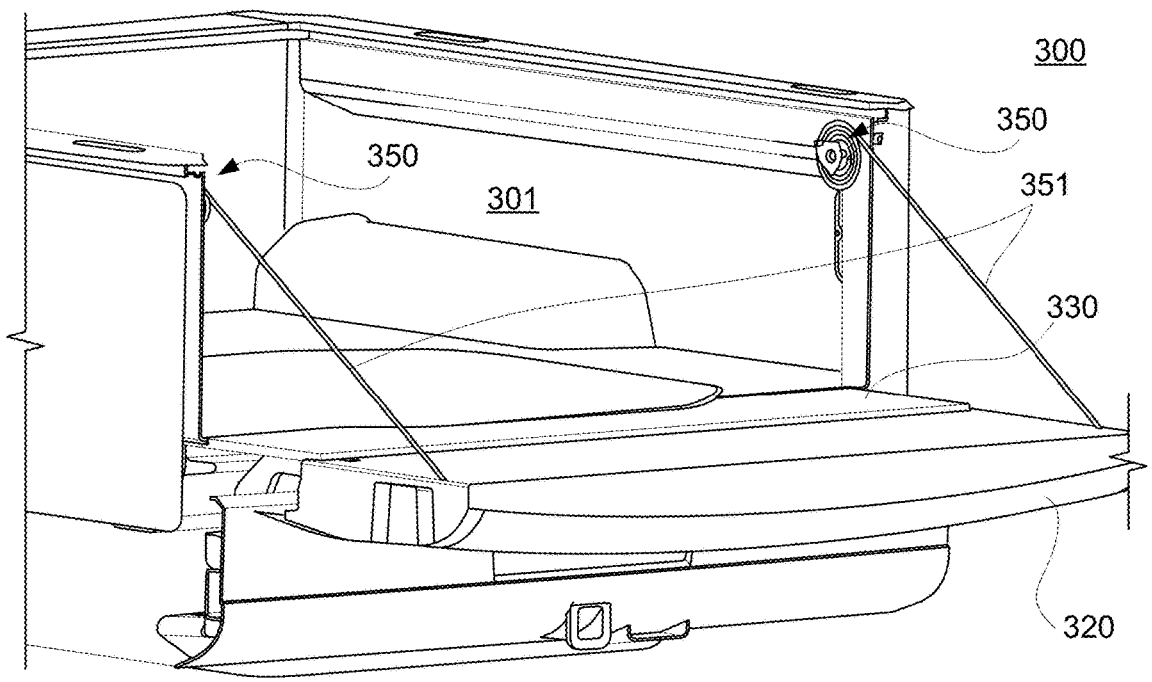
FIG. 3 shows a perspective view of an illustrative vehicle having a tailgate dropped to a 90° position, in accordance with some embodiments of the present disclosure.
Figure 4:
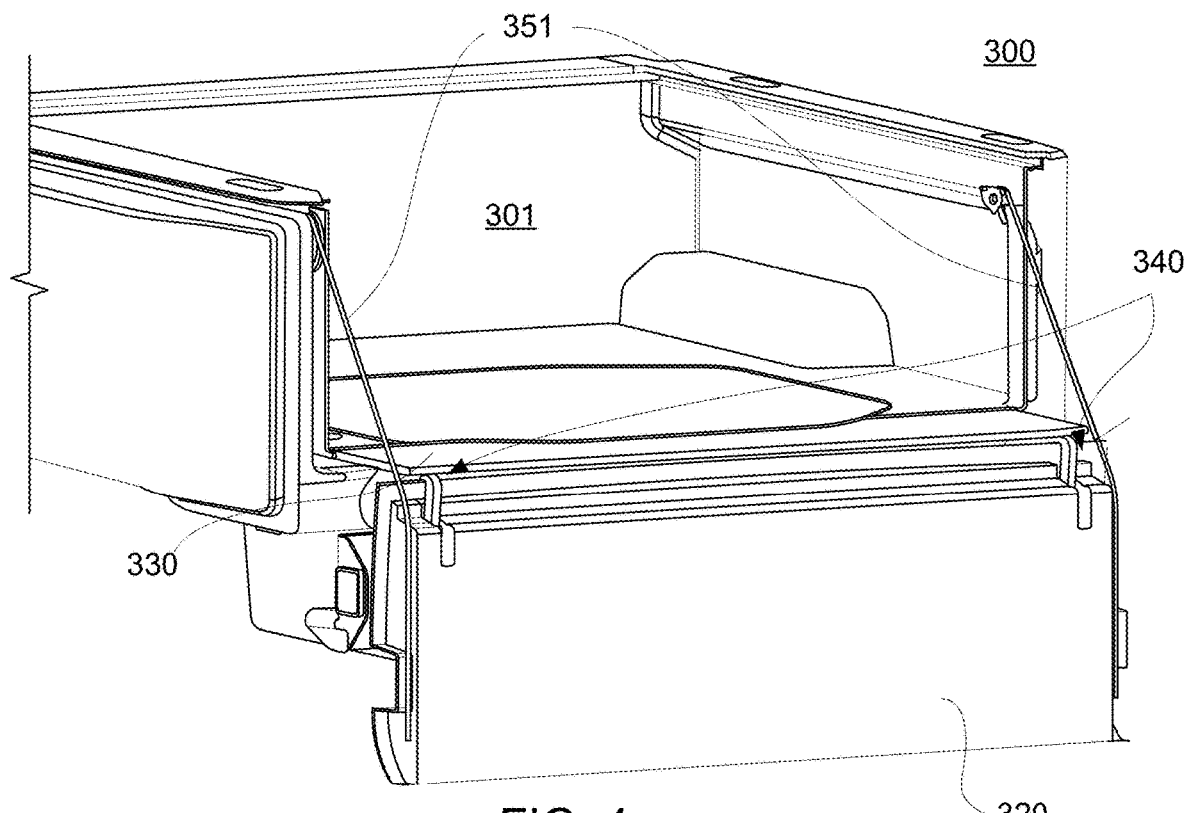
FIG. 4 shows a perspective view of the illustrative vehicle of FIG. 3 having the tailgate dropped to a 180° position, in accordance with some embodiments of the present disclosure.

FIG. 3 shows a perspective view illustrative vehicle 300 having tailgate 320 dropped to a 90° position, in accordance with some embodiments of the present disclosure. FIG. 4 shows a perspective view of illustrative vehicle 300 of FIG. 3 having tailgate 320 dropped to a 180° position, in accordance with some embodiments of the present disclosure. Illustrative tailgate 320 shown in FIGS. 3-4 is coupled to winch-and-cable mechanism 350 configured to affect motion of tailgate 320. Cables 351 of winch-and-cable mechanism 350 constrain downward rotation of tailgate 320 about hinge mechanism 340. Hinge assembly 340 includes a hinge arm configured to rotate relative to vehicle 300 (e.g., between about 0-90°), and allow relative rotation of tailgate 320 (e.g., between about 90-180°). Cover plate 330, shown rotated down in both FIGS. 3-4, is configured to cover hinge assembly 340 and extend the usable horizontal bed surface of cargo bed 301.

Figure 5:
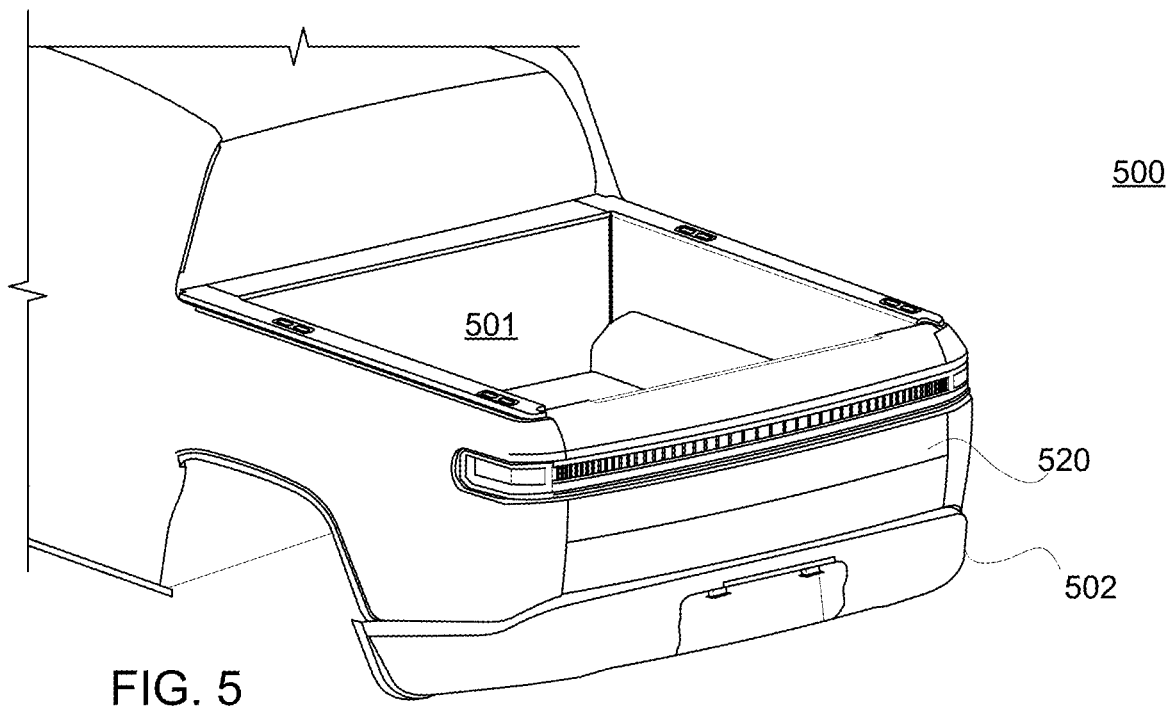
FIG. 5 shows a perspective view of an illustrative vehicle having a tailgate in a closed position (e.g., 0° as shown), in accordance with some embodiments of the present disclosure.
Figure 6:
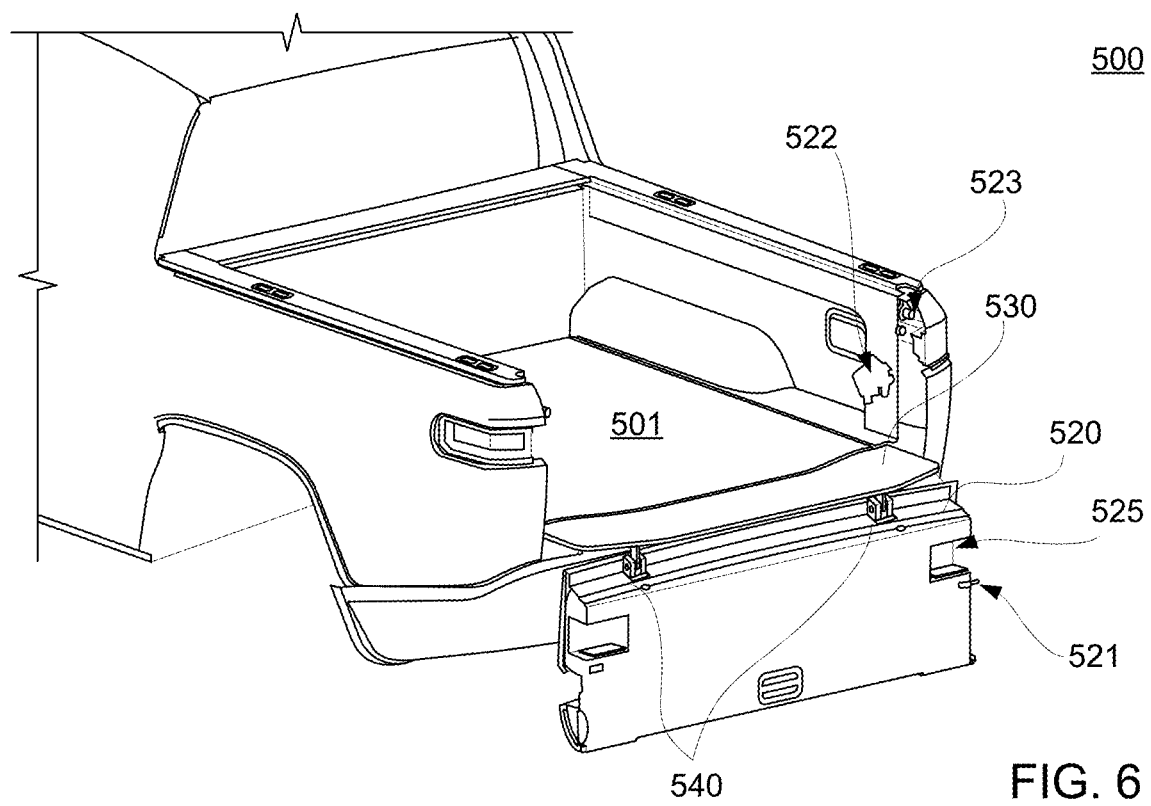
FIG. 6 shows a perspective view of the illustrative vehicle of FIG. 5 having the tailgate dropped to a 180° position, in accordance with some embodiments of the present disclosure.

FIG. 5 shows a perspective view of illustrative vehicle 500 having tailgate 520 in a closed position (e.g., 0° as shown), in accordance with some embodiments of the present disclosure. FIG. 6 shows a perspective view of illustrative vehicle 500 of FIG. 5 having tailgate 520 dropped to a 180° position, in accordance with some embodiments of the present disclosure. Tailgate 520 assembly may include or be coupled to actuators, dampers, springs, struts, latches, bump stops, any other suitable components, or any combination thereof. Hinge assembly 540 includes a hinge arm configured to rotate relative to vehicle 500 (e.g., between about 0-90°), and allow relative rotation of the tailgate (e.g., between about 90-180°). Cover plate 530 is configured to cover hinge assembly 540 and extend the usable horizontal bed surface of cargo bed 501 when tailgate 520 is dropped, and fold against tailgate 520 when tailgate 520 is closed (e.g., at) 0°. FIG. 6 shows latch pin 521 (e.g., a striker), configured to engage with latch mechanism 522 to secure tailgate 520 in the closed position. FIG. 6 also shows bump stop 523 configured to stop travel of tailgate 520 at 0° (e.g., the closed position). As illustrated, tailgate 520 includes steps 525.

Figure 7:
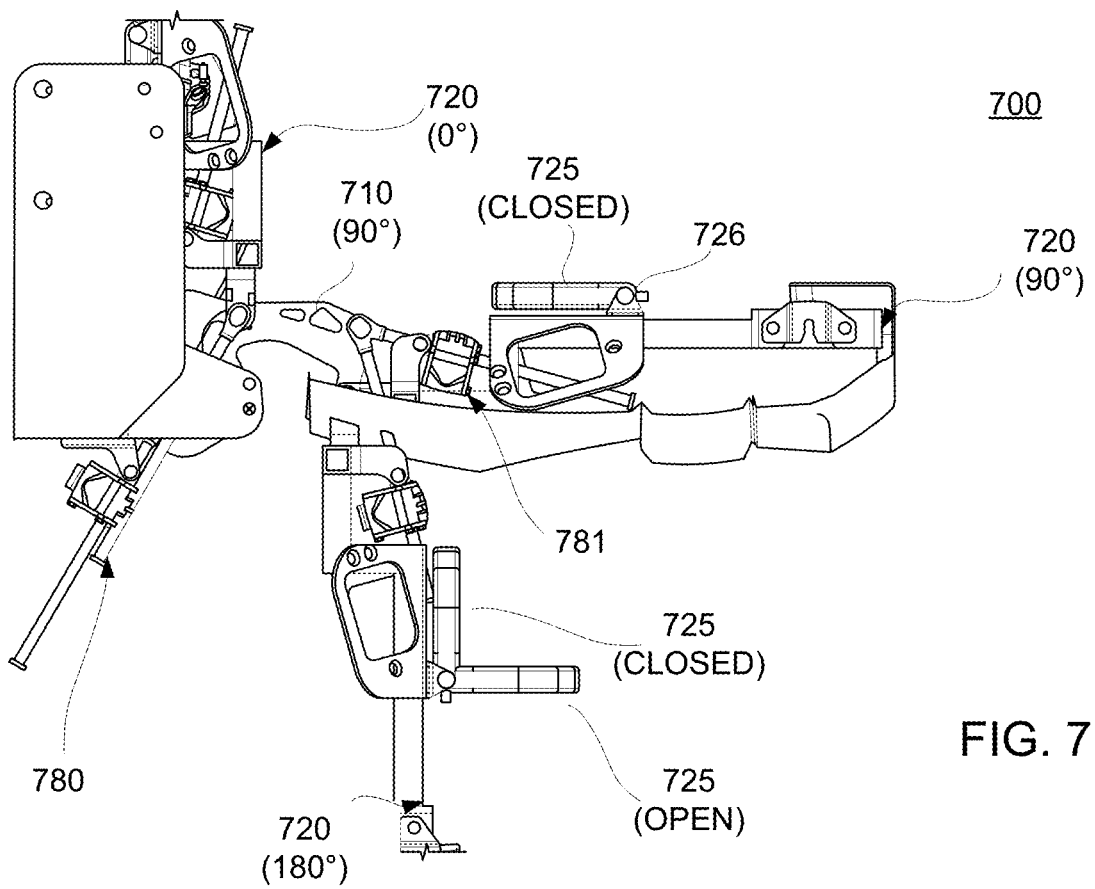
FIG. 7 shows a side cross-sectional side view of a portion of an illustrative vehicle having a tailgate, and a step, in accordance with some embodiments of the present disclosure.
Figure 8:
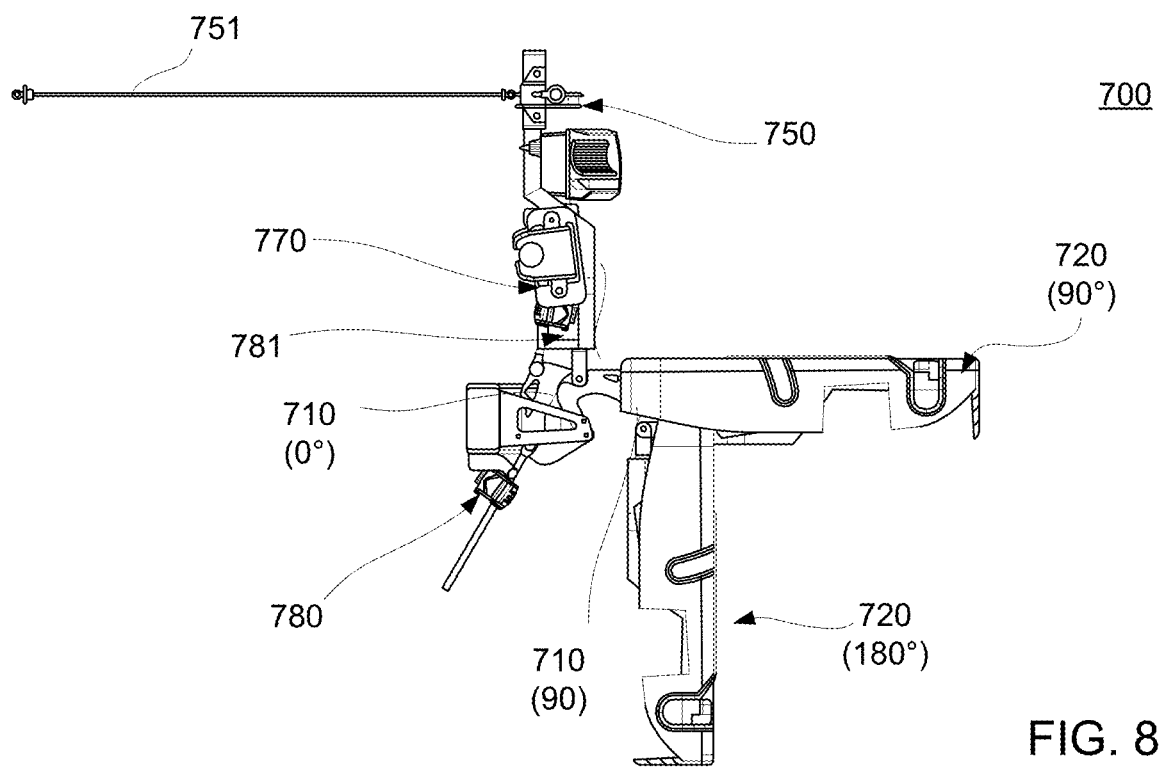
FIG. 8 shows the tailgate of FIG. 7 in the closed position (e.g., the sheet metal of the tailgate is not visible), the 90° position, and the 180° position, in accordance with some embodiments, of the present disclosure.

FIG. 7 shows a side cross-sectional view of a portion of illustrative vehicle 700 having tailgate 720, and step 725, in accordance with some embodiments of the present disclosure. FIG. 8 shows another side cross-sectional view of a portion of illustrative vehicle 700 of FIG. 7, without step 725 or the sheet metal of tailgate 720, in accordance with some embodiments of the present disclosure. Three tailgate positions are illustrated in FIG. 7; closed, dropped to 90°, and dropped to 180°. In the closed position, tailgate 720 is vertical or nearly vertical, and hinge arm 710 is in a first position. In rotating from the 0° position to the dropped 90° position, tailgate 720 and hinge arm 710 rotate as a rigid body about the first hinge. The dropped to 90° position provides an extension of the cargo bed as well as allowing for access to the bed without reaching over the tailgate. In rotating from the 90° position to the 180° position, the hinge arm remains stationary, while tailgate 720 rotates a further 90° about the second hinge to achieve a second vertical position (approximately upside-down relative to the first vertical position in the closed position). The dropped to 180° position provides access to the cargo bed without requiring a user to reach over tailgate 720 or be positioned a length of tailgate 720 away. In a conventional single-hinge tailgate, the longer the gate, the further back a user must be positioned to access the bed when the tailgate is dropped. In some embodiments, the tailgate assembly may include a cover plate (not shown) coupled to the vehicle by a cover plate hinge (not shown). Two positions of step 725 are illustrated in FIG. 7; closed and open. For example, step 725 may be closed against tailgate 720, and opened in the 180° dropped position by rotating the step 90° about step hinge 726. In some embodiments, step 725 is configured to move to the open position based on a gravitational force when the tailgate is at or near 180°, and wherein the step is constrained to rotate about the step hinge based on the gravitational force. In some embodiments, the tailgate assembly includes a step latch configured to constrain the step against tailgate 720. As shown in FIG. 7, the tailgate assembly includes two actuators; actuator 780 configured to actuate between 0-90° of the tailgate (e.g., acting between the vehicle and the hinge arm), and actuator 781 configured to actuate between 90-180° of the tailgate (e.g., acting between tailgate 720 and hinge arm 710). As illustrated, actuators 780 and 781 include rotary to linear actuators (e.g., worm gear type mechanisms). Any suitable actuator may be used such as, for example, rotary motors (e.g., acting on hinge joints), linear actuators (e.g., such as solenoids or pneumatic cylinders acting on structural members), tensioners (e.g., to pull or release a cable), or a combination thereof. In some embodiments, a tailgate assembly need not include any actuators (e.g., be manually powered and operated). In FIG. 7, actuator 781 is illustrated in three positions (e.g., extended and contracted, in two different orientations), actuator 780 is illustrated in two positions (e.g., extended and contracted), and hinge arm 710 is illustrated in two positions (e.g., 0° and 90°).

FIG. 8 shows tailgate 720 of FIG. 7 in the closed position (e.g., the sheet metal of tailgate 720 is not visible), the 90° position, and the 180° position. FIG. 8 also includes cable 751 and cable mechanism 750 configured to control motion of tailgate 720. Hinge arm 710 is illustrated in the 0° and 90° positions. Actuator 780 is visible in FIG. 8, illustrated in the contracted position (e.g., corresponding to tailgate 720 in the closed position, and hinge arm 710 at 0°). Also illustrated in FIG. 8 is latching mechanism 770 configured to secure tailgate 720 in the closed position.

Figure 9:
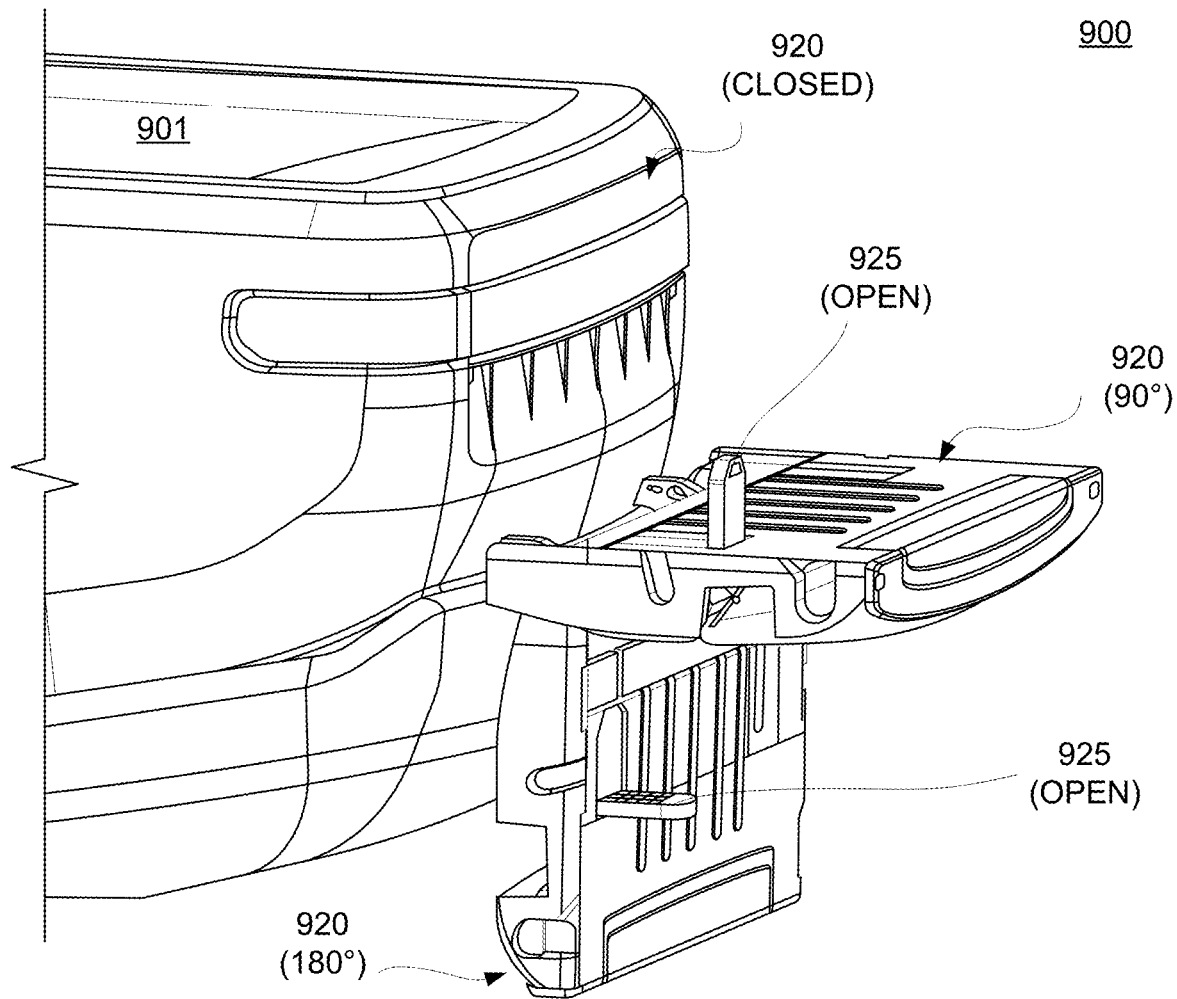
FIG. 9 shows a perspective view of an illustrative vehicle having a tailgate with a step, in accordance with some embodiments of the present disclosure.

FIG. 9 shows a perspective view of illustrative vehicle 900 having tailgate 920 with step 925, in accordance with some embodiments of the present disclosure. Three tailgate positions are illustrated in FIG. 9; closed, dropped to 90°, and dropped to 180°. Fold-out step 925 is illustrated in FIG. 9 in an open position for tailgate 920 in both the 90° position and 180° position. For example, when step 925 is open, and tailgate 920 is in the 180° position, a user may use step 925 to help in accessing cargo bed 901. As another example, when step 925 is open and tailgate 920 is in the 90° position, step 925 can be used as a stop to prevent items from falling out the bed.

Figure 10:
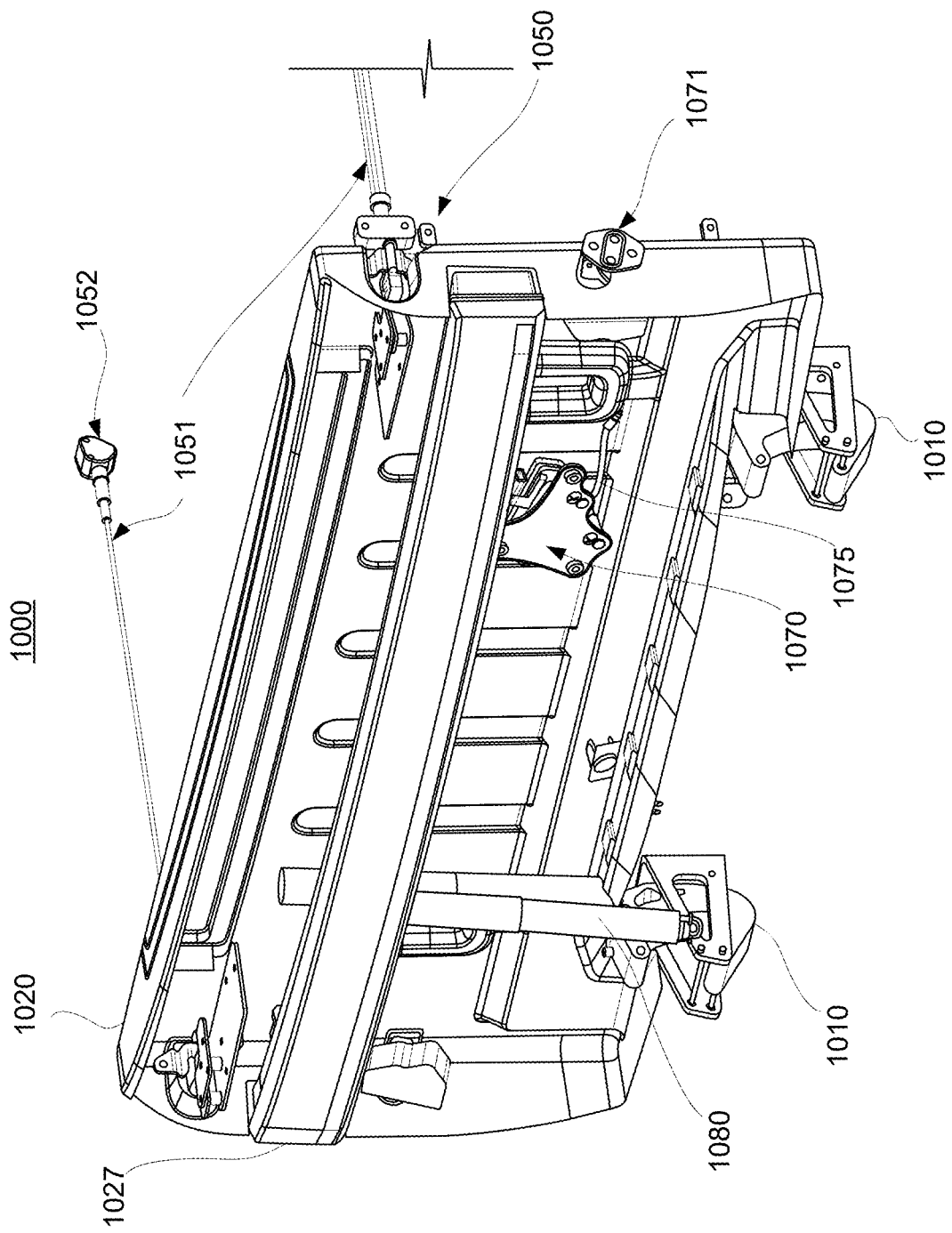
FIG. 10 shows a perspective cross-sectional view of an illustrate tailgate assembly in a closed position, in accordance with some embodiments of the present disclosure.

FIG. 10 shows a perspective cross-sectional view of illustrate tailgate assembly 1000 in a closed position, in accordance with some embodiments of the present disclosure. The tailgate assembly includes cable assembly 1050 and cable 1051 configured to control a position of tailgate 1020. The tailgate assembly includes two latch mechanisms 1070 (e.g., on either side of the tailgate) configured to secure the tailgate to the vehicle in the closed position. The tailgate assembly includes two latching actuators 1071 (e.g., corresponding to either side of tailgate 1020, although only one is shown in FIG. 10) configured to secure and release respective latch mechanism 1070 (e.g., using latch cable 1075). For example, as illustrated, latch actuator 1070 is coupled to latch mechanism 1071 by latch cable 1075. Latch actuator 1070 actuates latch cable 1075 by applying or relieving tension, and latch cable 1075 in turn applies or relieves tensile force on latch mechanism 1071, which may cause the tailgate 1020 to be secured or released. The tailgate assembly includes actuators 1080 (e.g., one on each side, although only one is shown in FIG. 10), configured to actuate tailgate 1020 between 90-180°. In some embodiments, as illustrated tailgate 1020 may house actuators 1080. In some embodiments, tailgate 1020 need not house actuators 1080. For example, actuators 1080 may be mounted to or otherwise housed by the remaining part of the vehicle (e.g., on a vehicle frame, sheet metal or body panel, or other suitable structural member). In some embodiments, tailgate 1020 includes one or more taillight assemblies 1027, control interfaces (e.g., user interface, not shown), any other suitable components or subsystems, or any combination thereof.

Figure 11:
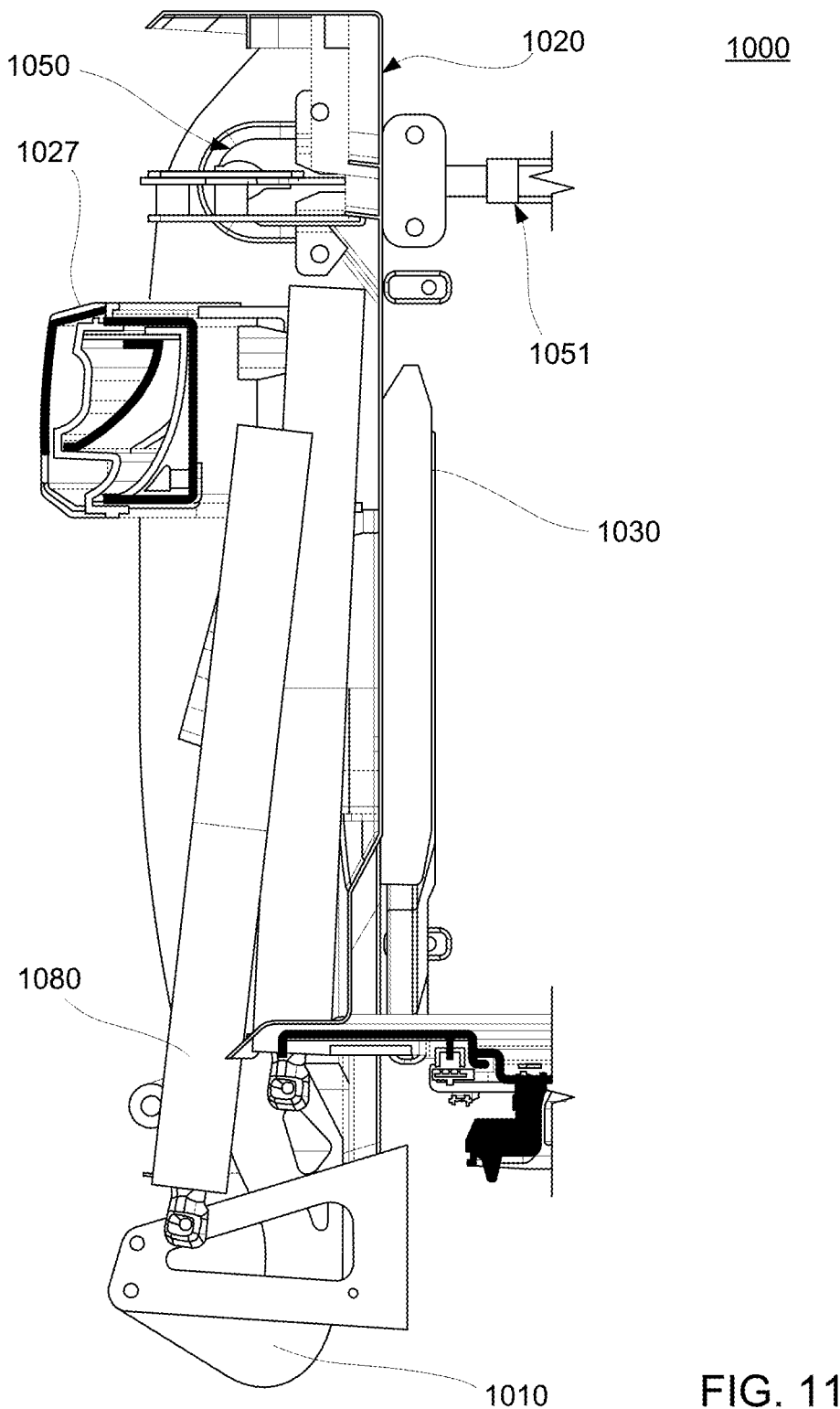
FIG. 11 shows a side cross-sectional side view of the illustrate tailgate assembly of FIG. 10 in the closed position, in accordance with some embodiments of the present disclosure.

FIG. 11 shows a side cross-sectional side view of illustrate tailgate assembly 1000 of FIG. 10 in the closed position, in accordance with some embodiments of the present disclosure. FIG. 11 more clearly shows cover plate 1030 which helps provide bed extension when tailgate 1020 is lowered.

Figure 12:
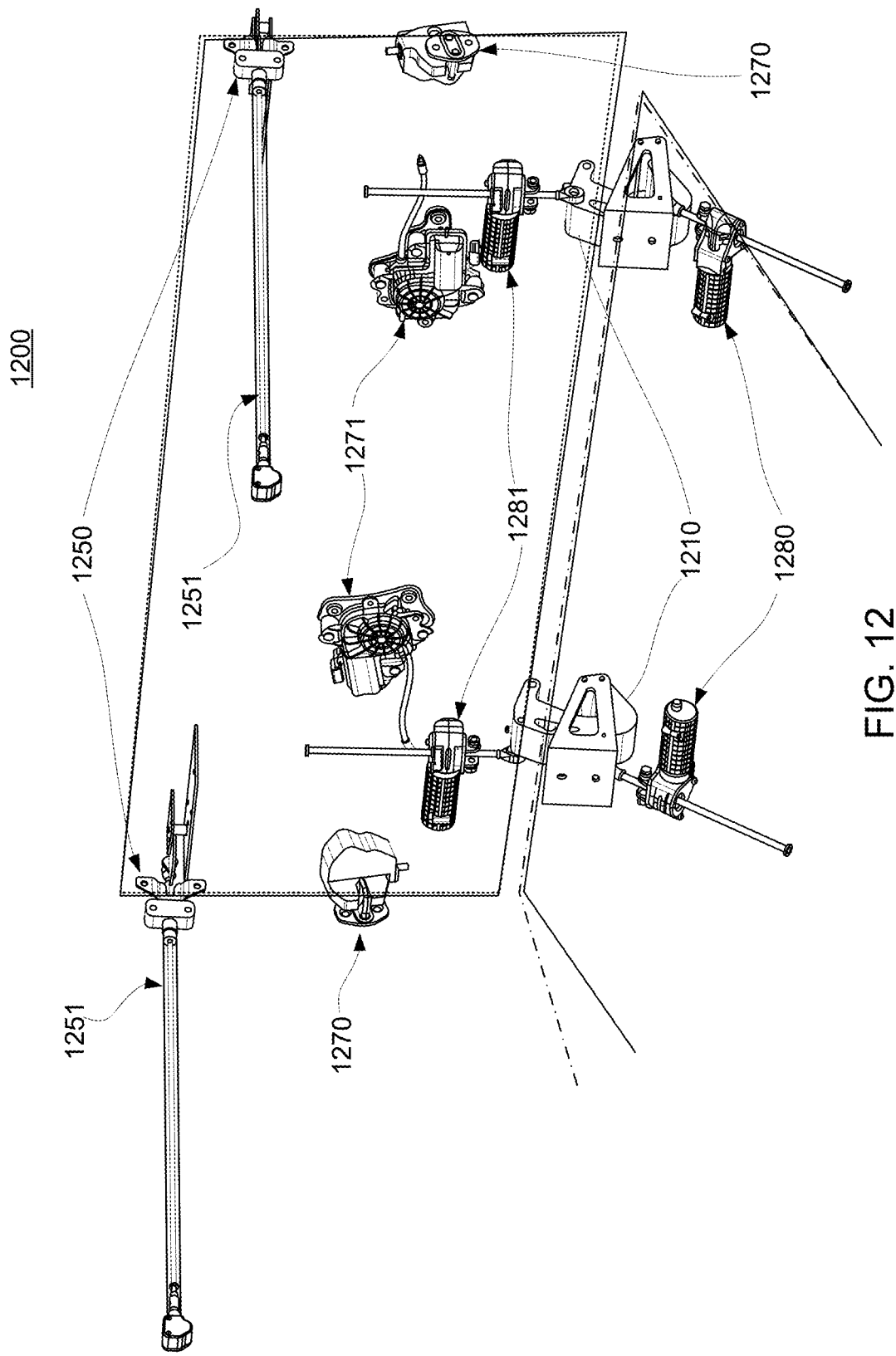
FIG. 12 shows a cross-sectional perspective view of an illustrative tailgate assembly in a closed position, in accordance with some embodiments of the present disclosure.
Figure 13:
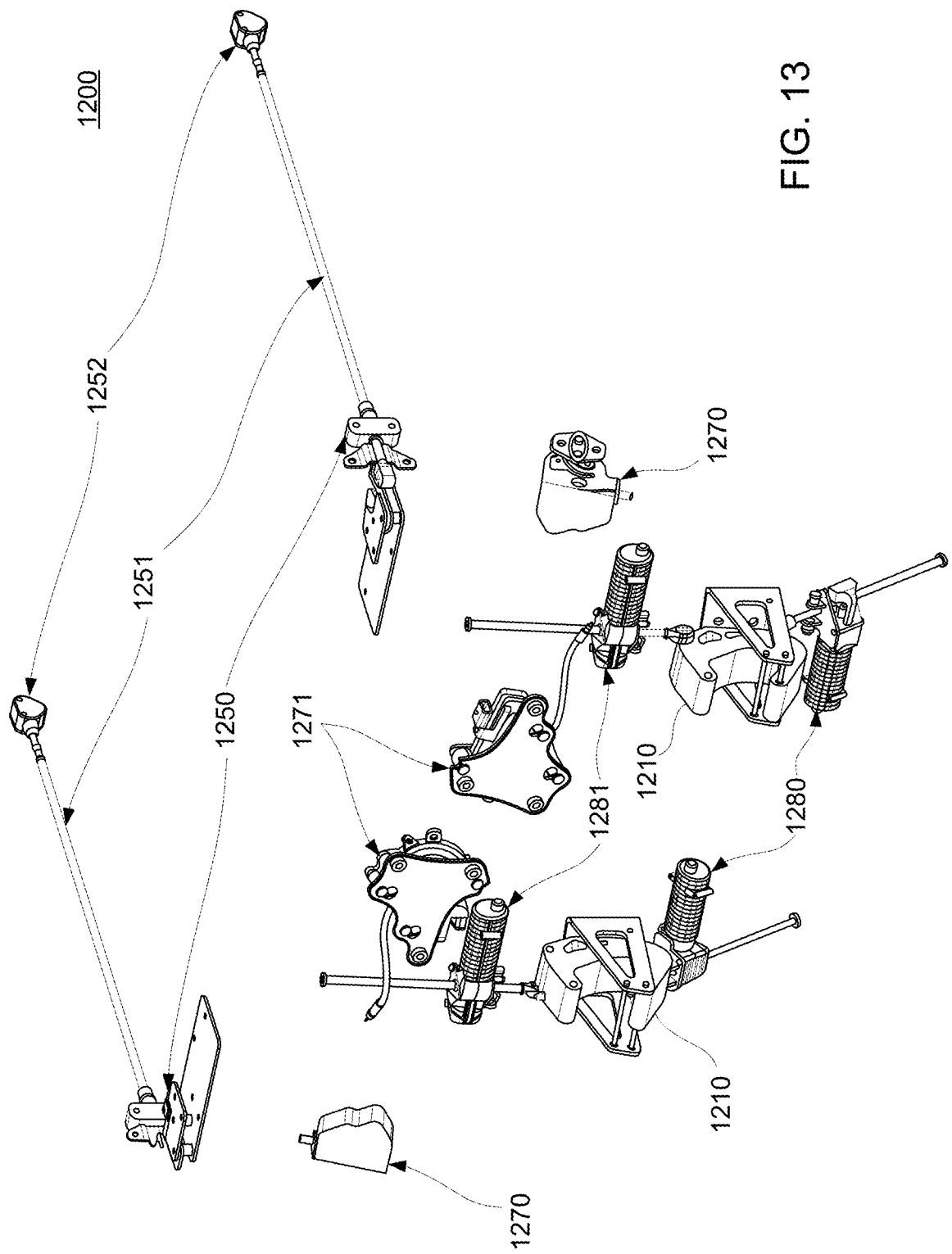
FIG. 13 shows the tailgate assembly of FIG. 12 from rearward of the tailgate assembly (e.g., viewer behind the vehicle), in accordance with some embodiments of the present disclosure.
Figure 14:
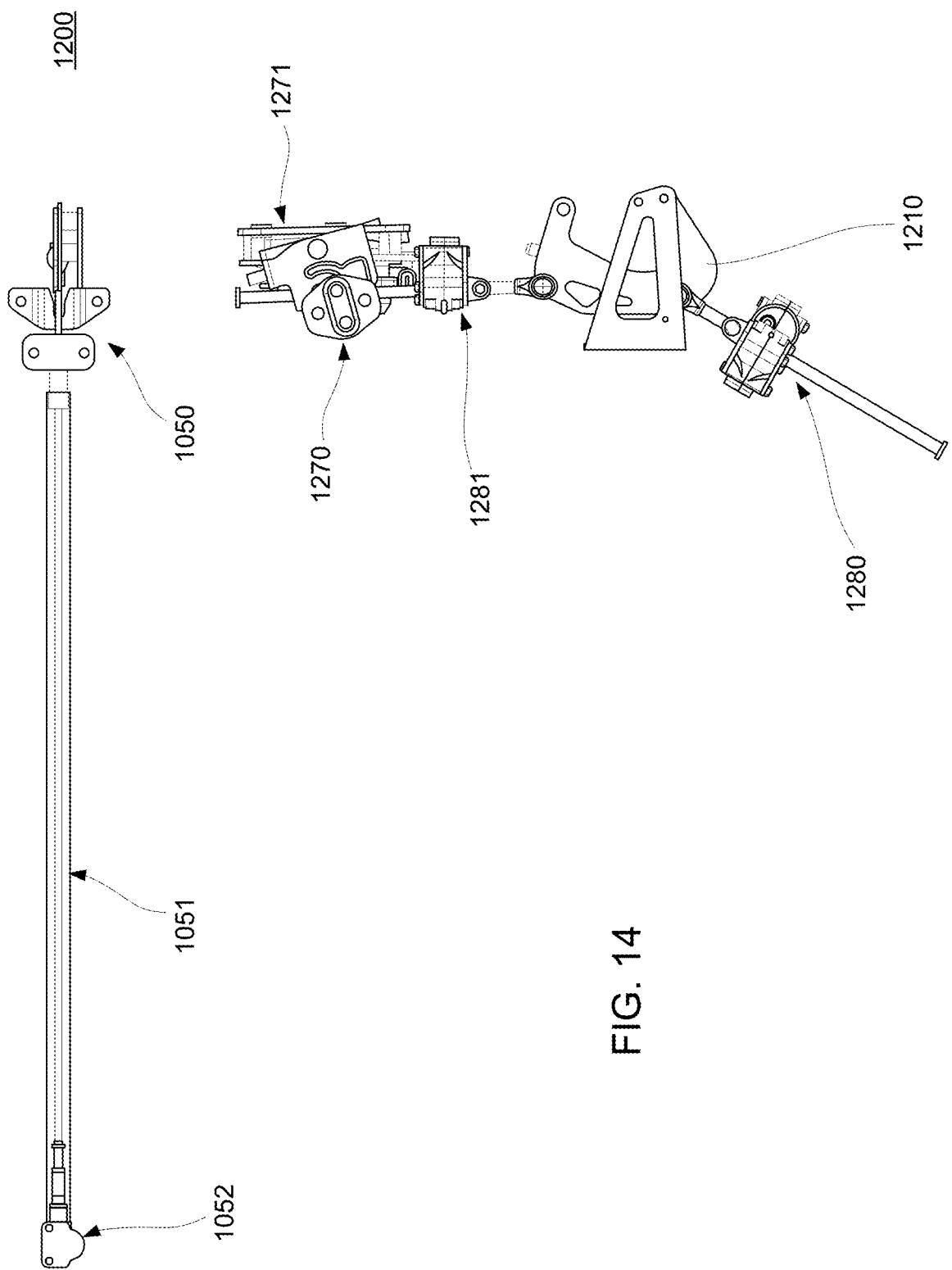
FIG. 14 shows a cross-sectional side view of the tailgate assembly of FIGS. 12-13, in accordance with some embodiments of the present disclosure.
Figure 15:
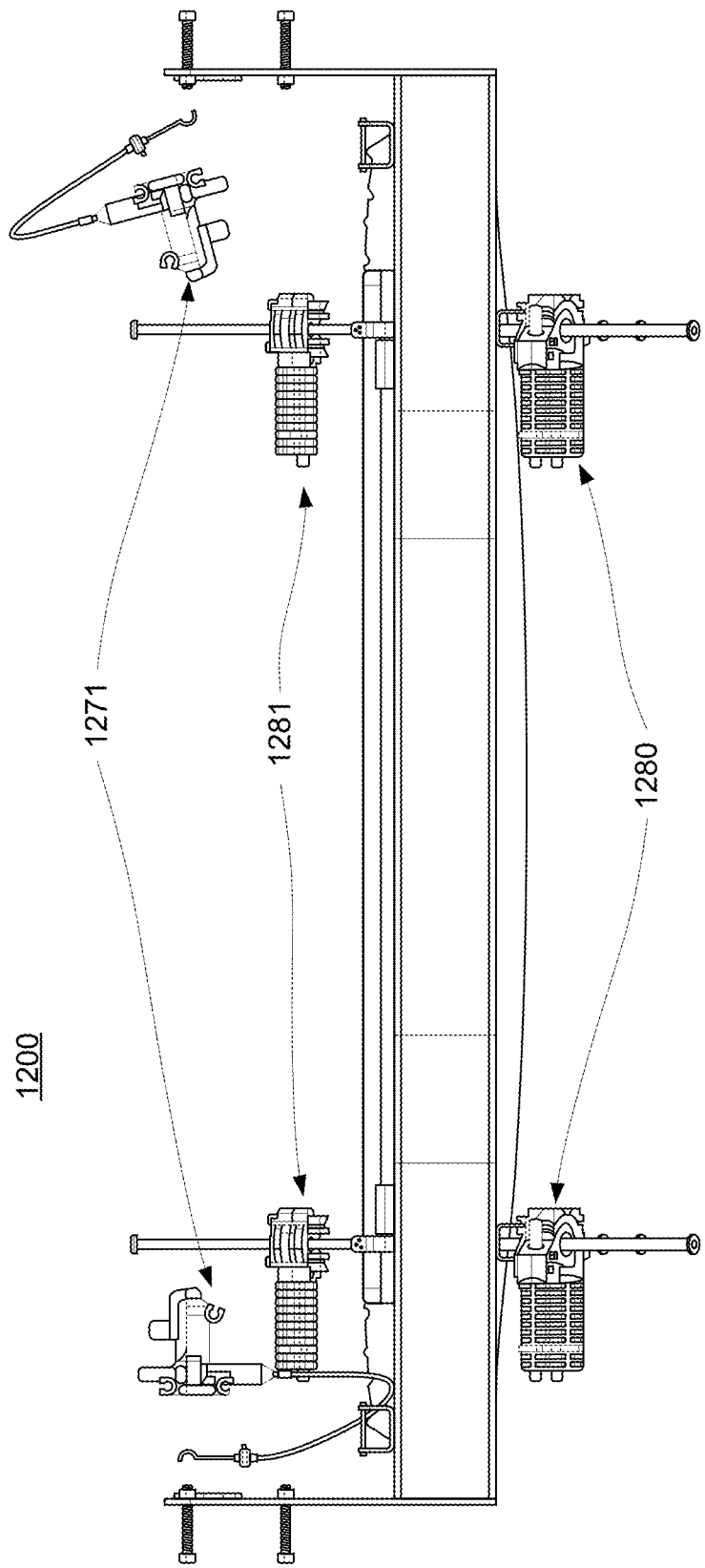
FIG. 15 shows a front cross-sectional view of a portion of the tailgate assembly of FIGS. 12-14, in accordance with some embodiments of the present disclosure.

FIG. 12 shows a cross-sectional perspective view of illustrative tailgate assembly 1200 in a closed position, in accordance with some embodiments of the present disclosure. Tailgate assembly 1200 includes a pair of actuators 1280 configured to actuate hinge arms 1210 between about 0-90°. Tailgate assembly 1200 includes a pair of actuators 1281 configured to actuate the tailgate (not shown) between about 90-180° relative to the second hinge point on hinge arm 1210. Tailgate assembly 1200 includes a pair of cables 1251 and cable mechanisms 1250 configured to limit the travel of the tailgate (e.g., to between 0-90°). For example, either or both of cables 1251 may be released from (e.g., not engaged with) respective cable mechanism 1250 to allow the tailgate to move between 90-180°. Tailgate assembly 1200 includes a pair of latch mechanisms 1270 configured to secure the tailgate in the closed position against the vehicle bed. Tailgate assembly 1200 includes a pair of latching actuators 1271 configured to secure and release the respective latch mechanisms 1270. FIG. 12 shows the perspective view from forward of the tailgate (e.g., viewer next to the vehicle forward of the cargo bed). FIG. 13 shows the tailgate assembly of FIG. 12 from rearward of tailgate assembly 1200 (e.g., viewer behind the vehicle). FIG. 14 shows a cross-sectional side view of the tailgate assembly of FIGS. 12-13 (e.g., viewer next to side of tailgate). FIG. 15 shows a front cross-sectional view of a portion of tailgate assembly 1200 of FIGS. 12-14 (e.g., for FIG. 15 viewed from cargo bed in front of tailgate assembly 1200). The pair of latch mechanisms 1270 need not have the same orientation (e.g., the latch actuators 1271 may be coupled by respective cables to respective latch mechanisms 1270, but the path of the latch cables need not be the same as each other). Actuators 1280 and 1281 may be oriented in any suitable arrangement (e.g., the body of actuators 1280 and 1281 may be rotated for example about the threaded shaft, illustrated in FIGS. 12-15).

In accordance with the present disclosure, a tailgate assembly may include actuators and linkages, as well as springs, dampers, bump stops, and any other suitable components to constrain or otherwise control a motion or position of the tailgate. FIGS. 16-20 illustrate tailgate assemblies, or portions thereof, that include components for constraining or otherwise controlling a motion or position of a tailgate.

Figure 17:
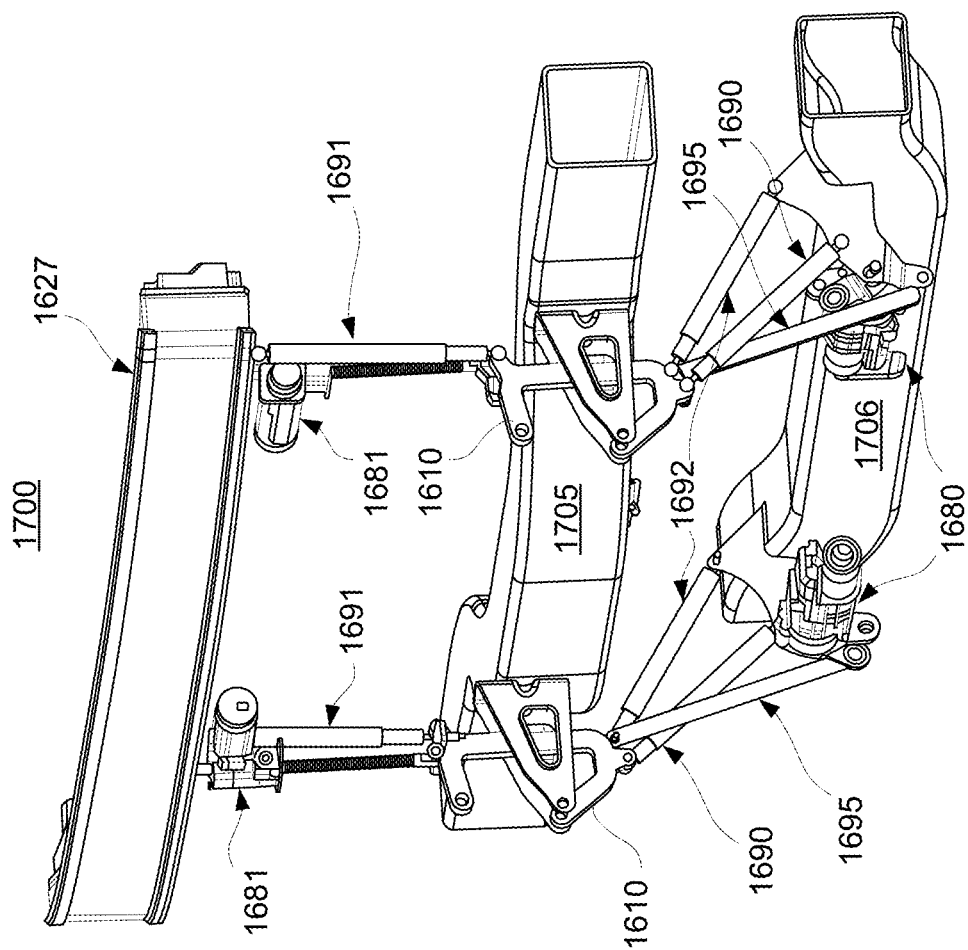
FIG. 17 shows a perspective cross-sectional view of an illustrative tailgate assembly, including the hinge arms and linear elements of FIG. 16, in accordance with some embodiments of the present disclosure.
Figure 16:
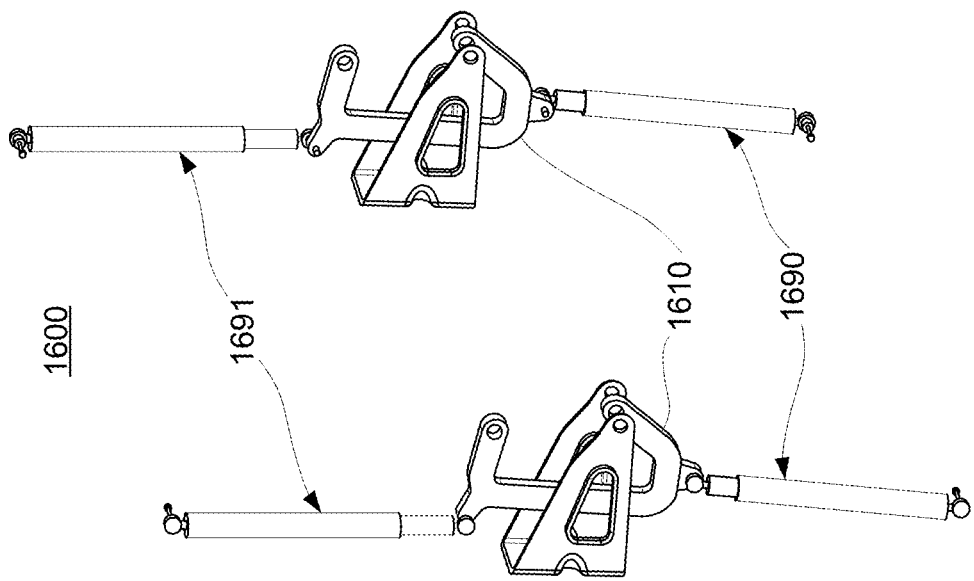
FIG. 16 shows a perspective cross-sectional view of illustrative hinge arms and linear elements (e.g., springs, dampers or both), in accordance with some embodiments of the present disclosure.

FIG. 16 shows a perspective cross-sectional view of illustrative hinge arms and linear elements (e.g., springs, dampers or both, but shown as "springs 1" and "springs 2"), in accordance with some embodiments of the present disclosure. FIG. 17 shows a perspective cross-sectional view of illustrative tailgate assembly 1700, including the hinge arms and linear elements of FIG. 16, in accordance with some embodiments of the present disclosure. Tailgate assembly 1700 includes a pair of actuators 1780 configured to act on respective struts 1695, which in turn act on respective hinge arms 1610 to rotate hinge arms 1610 between 0-90°. As illustrated, actuators 1680 are rotary actuators, but may include any suitable actuator type. Tailgate assembly 1700 includes a pair of actuators 1681 configured to act on respective hinge arms 1610 and the tailgate (not shown), to rotate the tailgate between the 90-180° positions. As illustrated, actuators 1681 are linear actuators, but may include any suitable actuator type. Linear elements such as springs 1690, springs 1691, and springs 1692 are configured to limit, constrain, act on, or otherwise affect motion of the tailgate assembly. For example, linear elements may include springs, dampers (e.g., shocks), struts, any other suitable components, or any combination thereof. As illustrated, hinge arms 1610 are coupled via a hinge joint to vehicle frame element 1705, which is positioned above vehicle frame element 1706. Actuators 1680, struts 1695, and springs 1690 and 1692 are coupled to vehicle frame element 1706.

Figure 18:
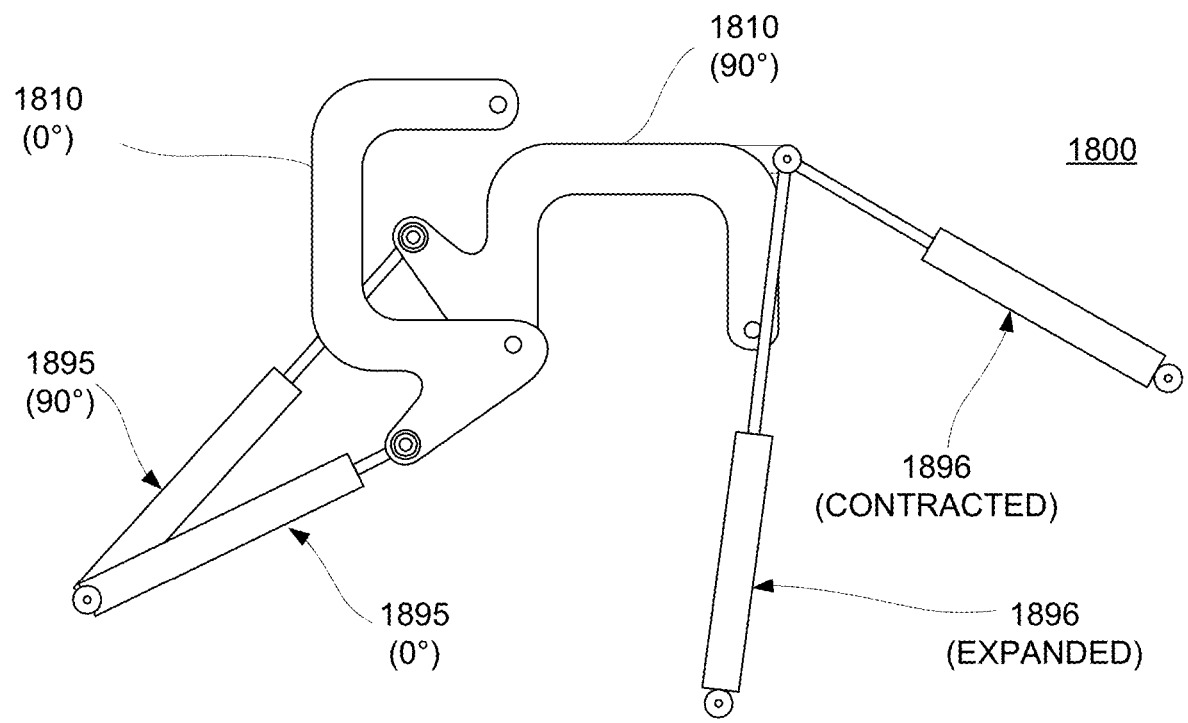
FIG. 18 shows a side view of an illustrative hinge assembly including a hinge arm and a pair of linear elements, in accordance with some embodiments of the present disclosure.

FIG. 18 shows a side view of illustrative hinge assembly 1800 including hinge arm 1810 and a pair of linear elements 1895 and 1896, in accordance with some embodiments of the present disclosure. When the tailgate (not shown) is in the closed position, hinge arm 1810 is in the 0° position, strut 1895 is in the 0° position, and strut 1896 is in the contracted position. When the tailgate is in the 90° position, hinge arm 1810 is in the 90° position, strut 1895 is in the 90° position, and strut 1896 is in the contracted position. When the tailgate is in the 180° position, hinge arm 1810 is in the 90° position, strut 1895 is in the 90° position, and strut 1896 is in the expanded position. In some embodiments, strut 1895, strut 1896, or both may be replaced by a linear actuator, a spring, a damper, any other suitable linear element, or any combination thereof.

In some embodiments, a tailgate assembly may include passive components, active components, or both. For example, a tailgate configured to manual actuation, automatic operation, or both, may include dampers, springs, detent mechanisms, bump stops, any other suitable components, or any combination thereof to control a motion or displacement of a tailgate. Any suitable motion may be powered by manual power (e.g., from the user), automated power (e.g., using an electric, pneumatic, or hydraulic actuator), or be capable of both.

Figure 19:
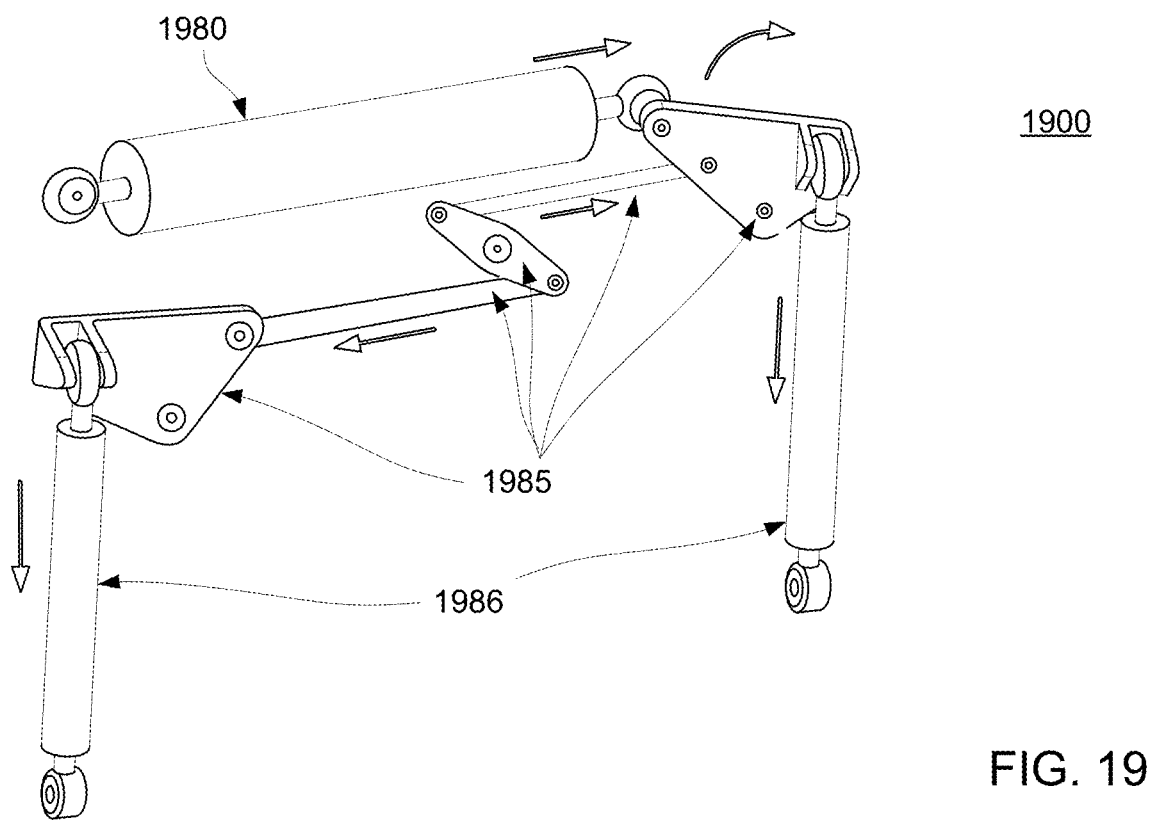
FIG. 19 shows a side view of an illustrative mechanism for actuating a tailgate between 90-180°, in accordance with some embodiments of the present disclosure.

FIG. 19 shows a side view of illustrative mechanism 1900 for actuating a tailgate (not shown) between 90-180°, in accordance with some embodiments of the present disclosure. Actuator 1980, as illustrated, is a linear actuator configured to apply a force on linkages 1985. Linkages 1985 in turn act on arms 1986 to cause motion along the axes illustrated by the arrows. Arms 1986 are coupled to hinge arms (not shown) and are configured to actuate the tailgate relative to the hinge arms.

Figure 20:
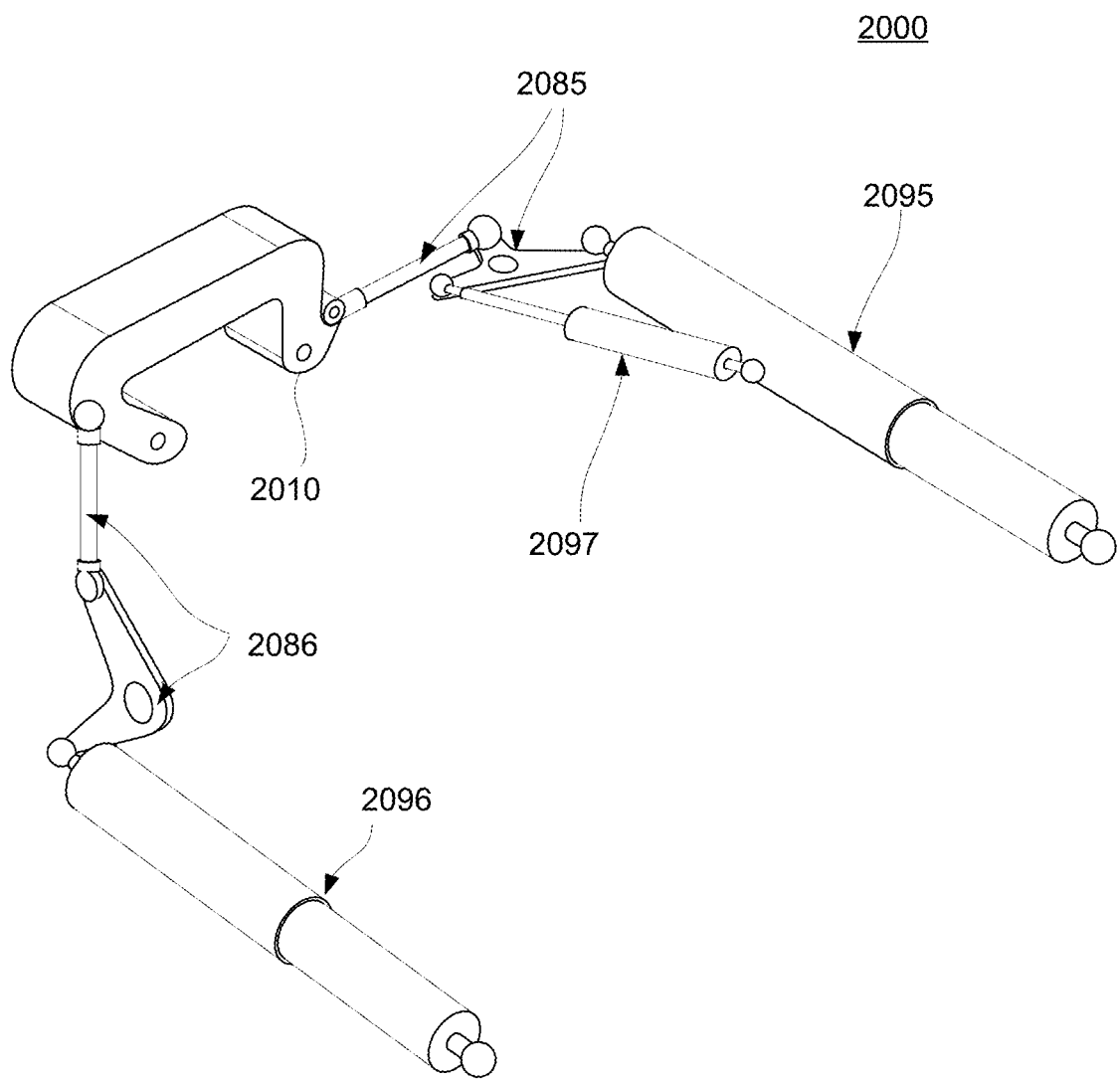
FIG. 20 shows a perspective view of an assembly for a hinge arm, in accordance with some embodiments of the present disclosure.

FIG. 20 shows a perspective view of assembly 2000 for hinge arm 2010, in accordance with some embodiments of the present disclosure. Hinge arm 2010 is coupled to air spring 2097 and strut 2095 by linkages 2085. Strut 2095 extends side-to-side in the vehicle. Hinge arm 2010 is coupled to strut 2096 by linkages 2086. Strut 2096 extends side-to-side in the tailgate. Struts 2095 and 2096 are configured to provide rigidity, stiffness, preload force, or a combination thereof, to a tailgate assembly.

Figure 21:
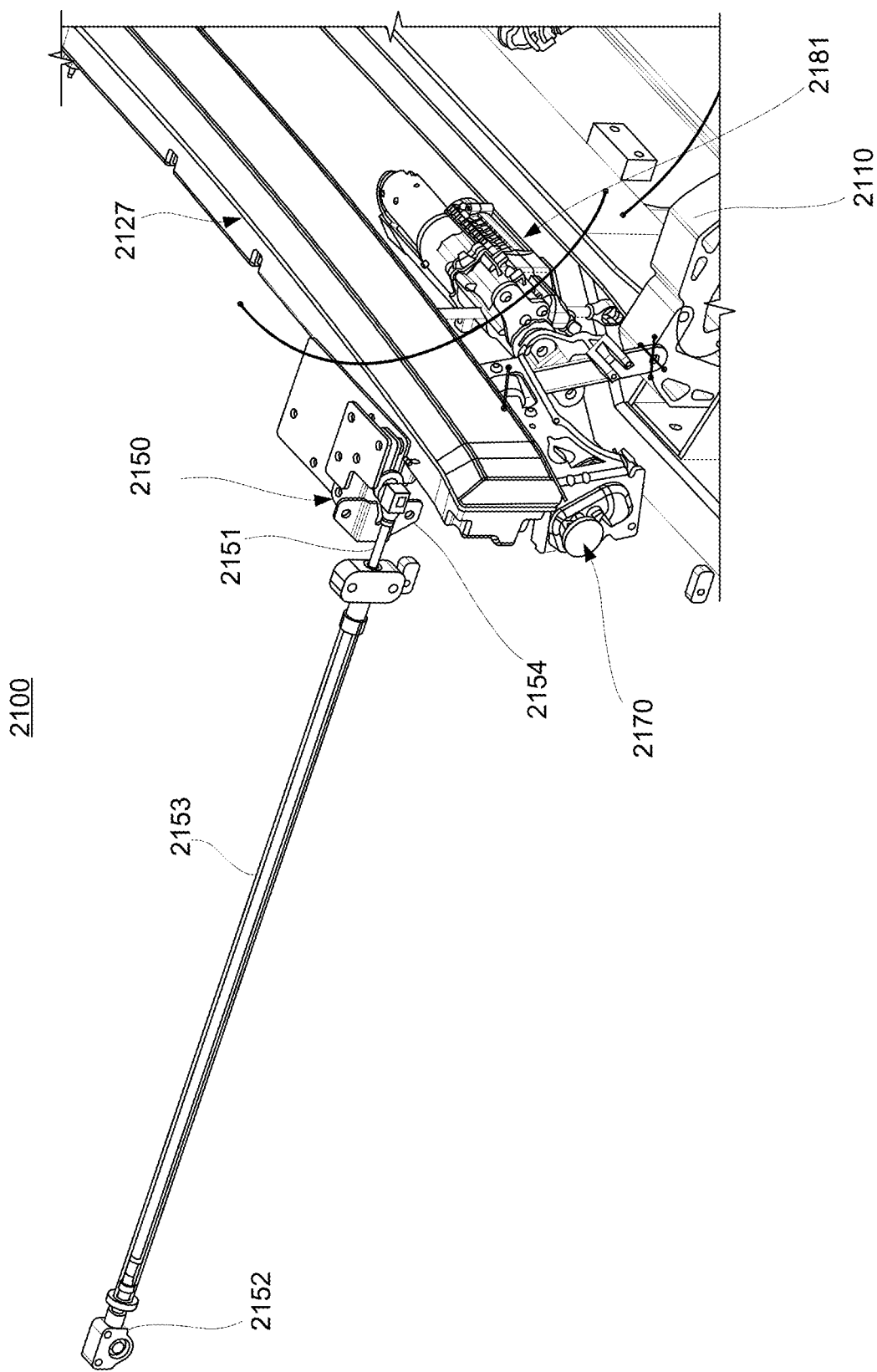
FIG. 21 shows a perspective view of an illustrative cable and cable mechanism of a tailgate assembly, in accordance with some embodiments of the present disclosure.
Figure 23:
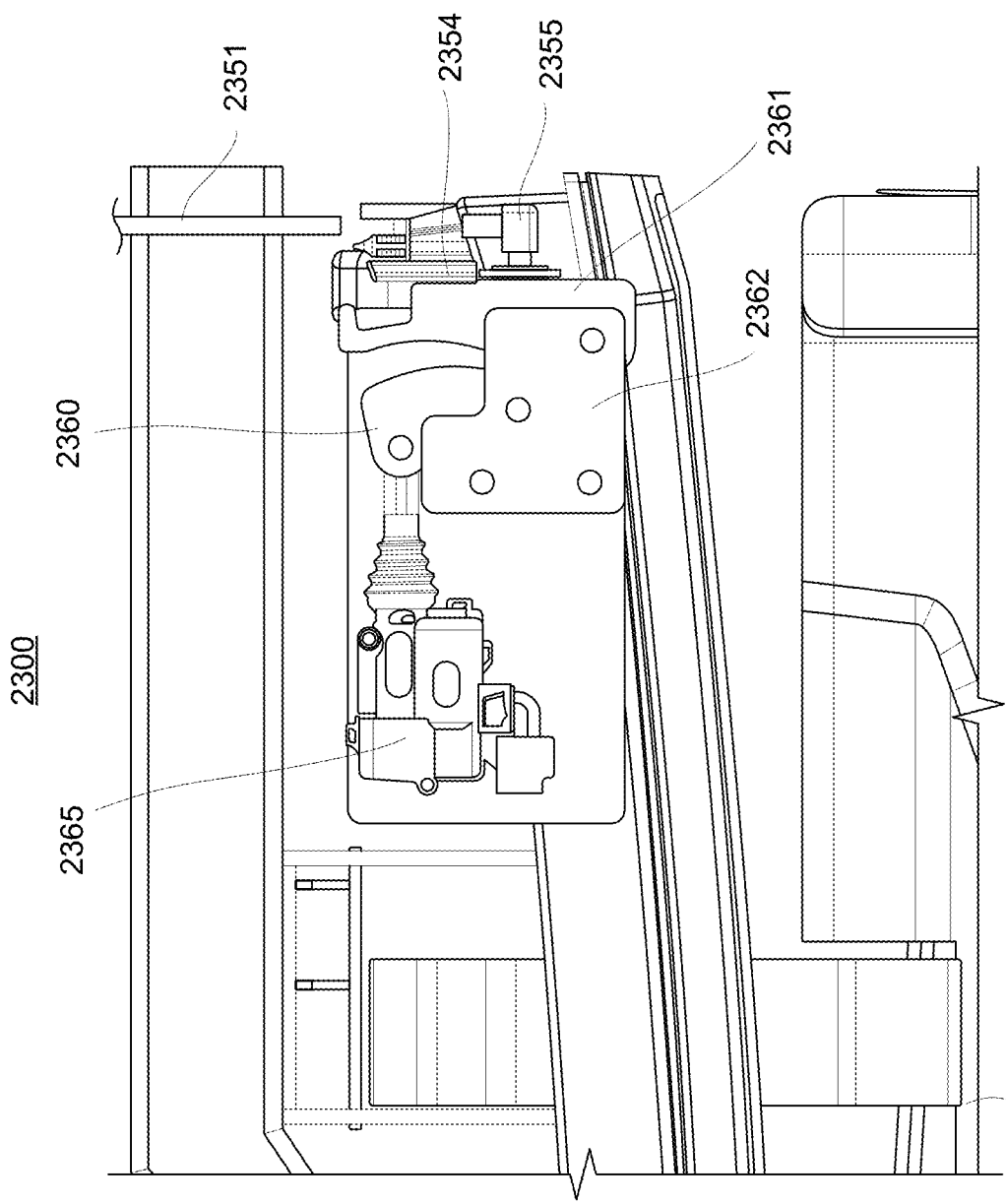
FIG. 23 shows a top view of a portion of a tailgate assembly (e.g., including a hinge arm) having a cable mechanism, in accordance with some embodiments of the present disclosure.
Figure 22:
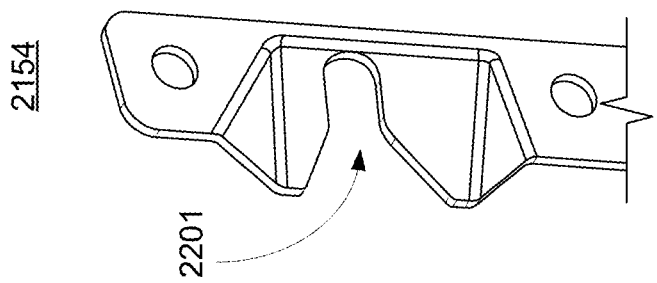
FIG. 22 shows a back perspective view of the illustrative cable catch of FIG. 21, in accordance with some embodiments of the present disclosure.

FIGS. 21-23 show an illustrative cable mechanism for affecting motion of a tailgate, in accordance with some embodiments of the present disclosure. In some embodiments, a cable and cable mechanism enable the tailgate to hold a significant load in the 90° position, which is a cantilevered position, but might not be necessary in the 180° position because the tailgate is essentially hanging. Accordingly, the cable can be removably attached depending on whether the tailgate is being moved to a 90° or to a 180° position. In some embodiments, control circuitry configured to control a cable mechanism receives an input that indicates which position the tailgate is to be moved to, and then the cable can be engaged to or released from the tailgate based on which input is received.

FIG. 21 shows perspective view of an illustrative cable and cable mechanism of tailgate assembly 2100, in accordance with some embodiments of the present disclosure. Cable 2151 is arranged in cable sheath 2153, with cable retractor 2152 at one end. Cable 2151 includes a cable end at the other end configured to engage with a cable catch 2154 of cable mechanism 2150. Cable mechanism 2150 also includes a release mechanism configured to allow or prevent cable catch 2154 from engaging with the cable end. Actuator 2181 is configured to actuate the tailgate (not shown) between 90-180° positions. Latching mechanism 2170 is configured to secure the tailgate against the vehicle. Taillight assembly 2127 may be included in the tailgate, as illustrated in FIG. 21.

FIG. 22 shows a back perspective view of illustrative cable catch 2154 illustrated in FIG. 21, in accordance with some embodiments of the present disclosure. In some embodiments, cable catch 2200 is a sheet metal catch (e.g., a fish-mouth structure), configured to engage with a cable end and transmit force between the tailgate and the cable. The cable catch includes notch 2201 in a raised portion, configured to secure a cable end.

FIG. 23 shows a top view of a portion of tailgate assembly 2300 (e.g., including hinge arm 2310) having a cable mechanism, in accordance with some embodiments of the present disclosure. Actuator 2365 (e.g., a solenoid-type linear actuator as shown) is configured to push and pull cam 2360, which is configured to rotate about fixed plate 2362. When actuator 2365 pushes cam 2360, cam 2360 engages rocker 2361 and pushes rocker 2361 to right as illustrated. Rocker 2361, when pushed to the right, prevents cable end 2355 from engaging cable catch 2354. Accordingly, when cable end 2355 does not engage cable catch 2354, the tailgate may achieve the 180° position. Further, when cable end 2355 does engage cable catch 2354, the tailgate may only achieve at most the 90° position (e.g., the cable length is predetermined for stopping the tailgate at the 90° position). The release of cable end 2355 from cable catch 2354 releases a constraint on the tailgate position, thus allowing the tailgate to achieve the 180° position.

In some embodiments, a cable end may include one or more features to more easily allow a cable to catch (e.g., and constrain rotation of the tailgate), or not catch (e.g., and not constrain rotation of the tailgate). For example, FIGS. 24-27 illustrate a different embodiment than that shown in FIG. 23, although aspects of either embodiments may be combined or otherwise use in accordance with the present disclosure.

Figure 24:
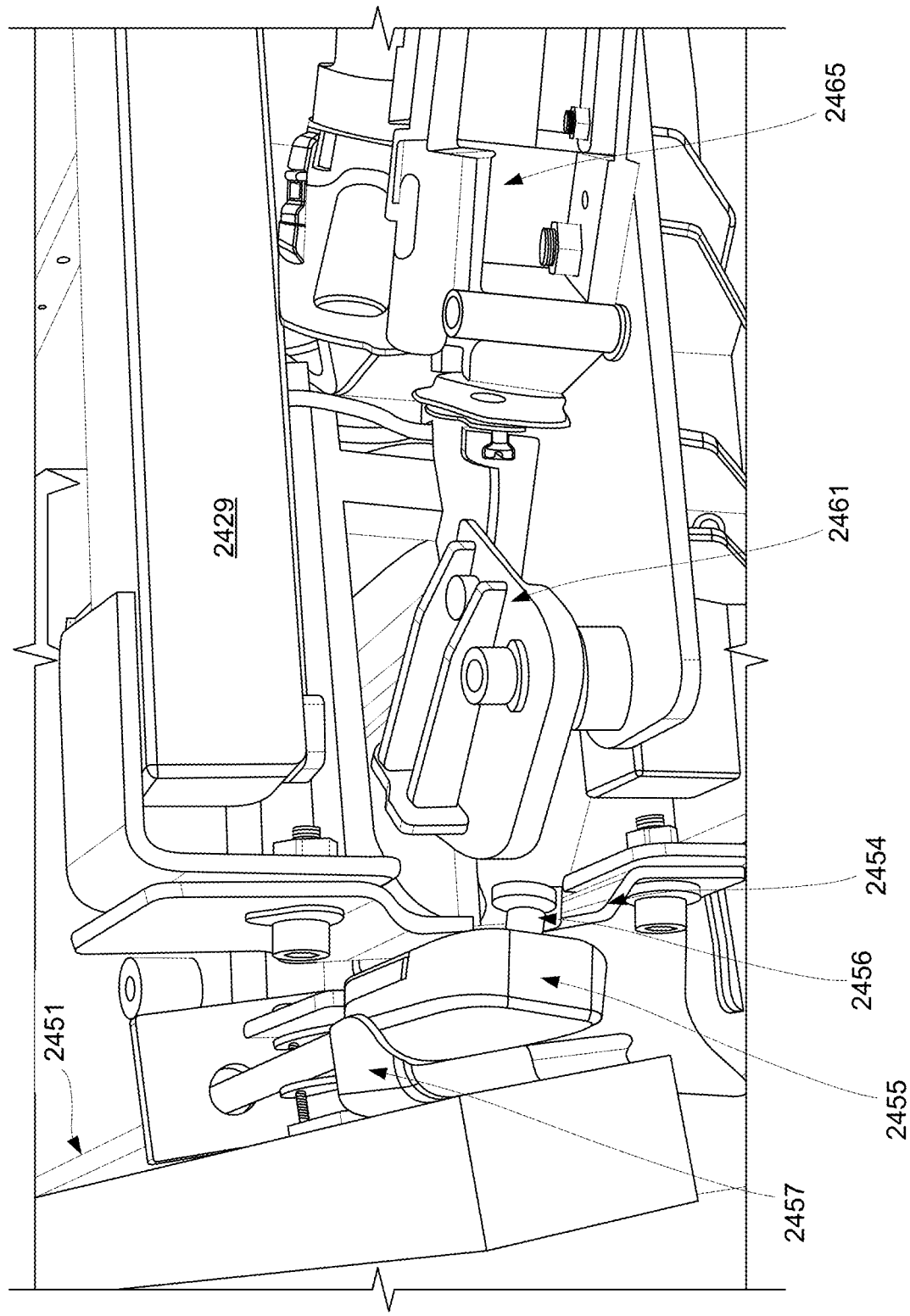
FIG. 24 shows a rear perspective view of an illustrative cable mechanism, with the tailgate in a closed position, in accordance with some embodiments of the present disclosure.

FIGS. 24-28 show another illustrative cable mechanism for affecting motion of a tailgate, in accordance with some embodiments of the present disclosure. FIG. 24 shows a rear perspective view of an illustrative cable mechanism, with the tailgate in a closed position, in accordance with some embodiments of the present disclosure. Tailgate frame 2429 is shown, with the sheet metal of the tailgate removed for purposes of illustration. Actuator 2465 is affixed to the tailgate and is configured to rotate rocker 2461 to prevent or allow pin 2456 of cable end 2455 to engage with cable catch 2454. As shown in FIG. 24, cable end 2455 is not yet engaged with cable catch 2454, even though actuator 2465 is not actuated. Accordingly, cable 2451 is not yet tensioned by the tailgate. Cable end 2455 is held in cable end holder 2457.

Figure 25:
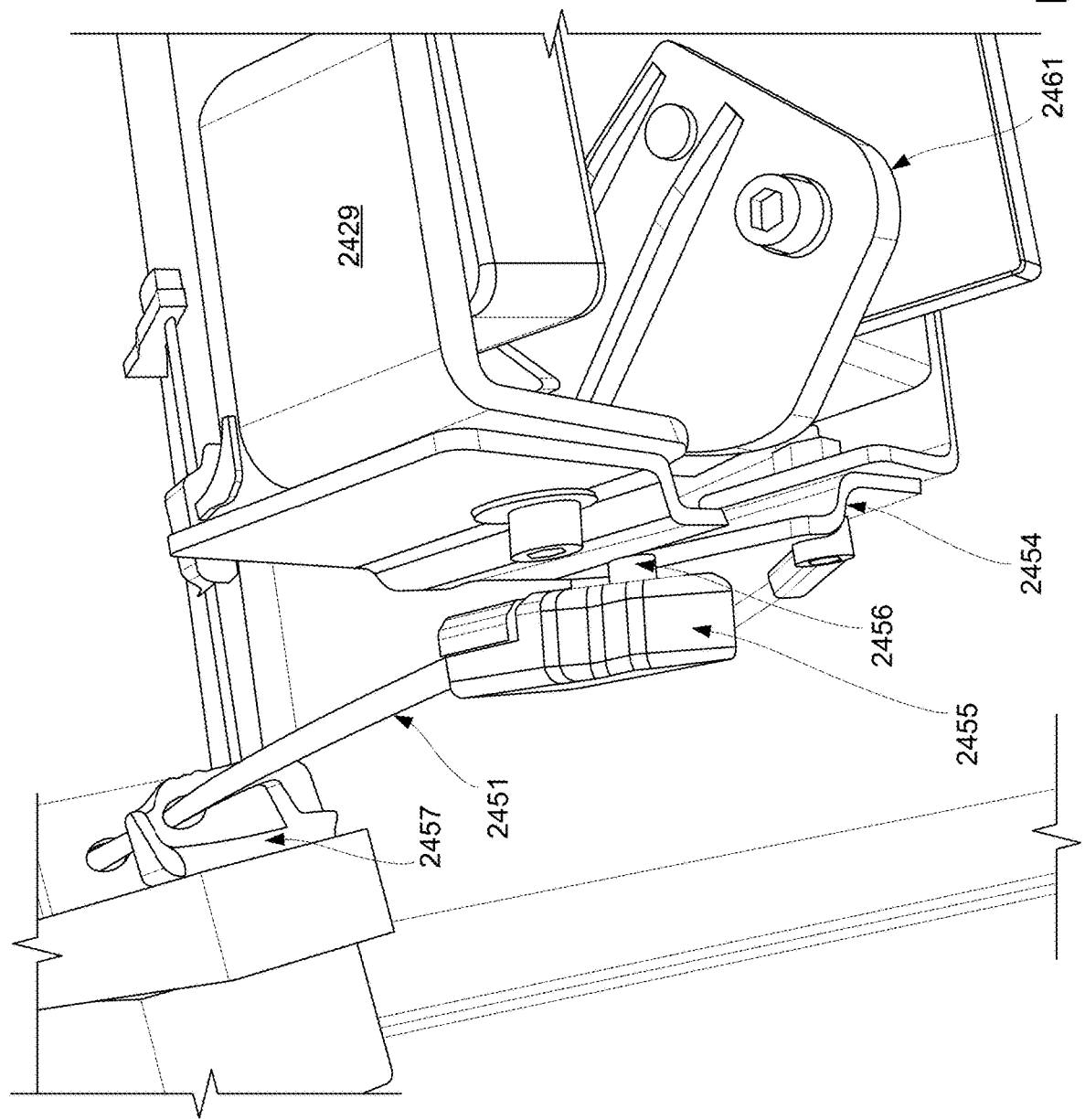
FIG. 25 shows another rear elevated perspective view of the illustrative cable mechanism of FIG. 24, with the tailgate in a closed position, in accordance with some embodiments of the present disclosure.

FIG. 25 shows a rear elevated perspective view photograph of the illustrative cable mechanism of FIG. 24, with the tailgate rotated about 10° from the closed position, in accordance with some embodiments of the present disclosure. Pin 2456 is engaged with cable catch 2454, and accordingly, the tailgate pulls cable 2451 as it rotates.

Figure 26:
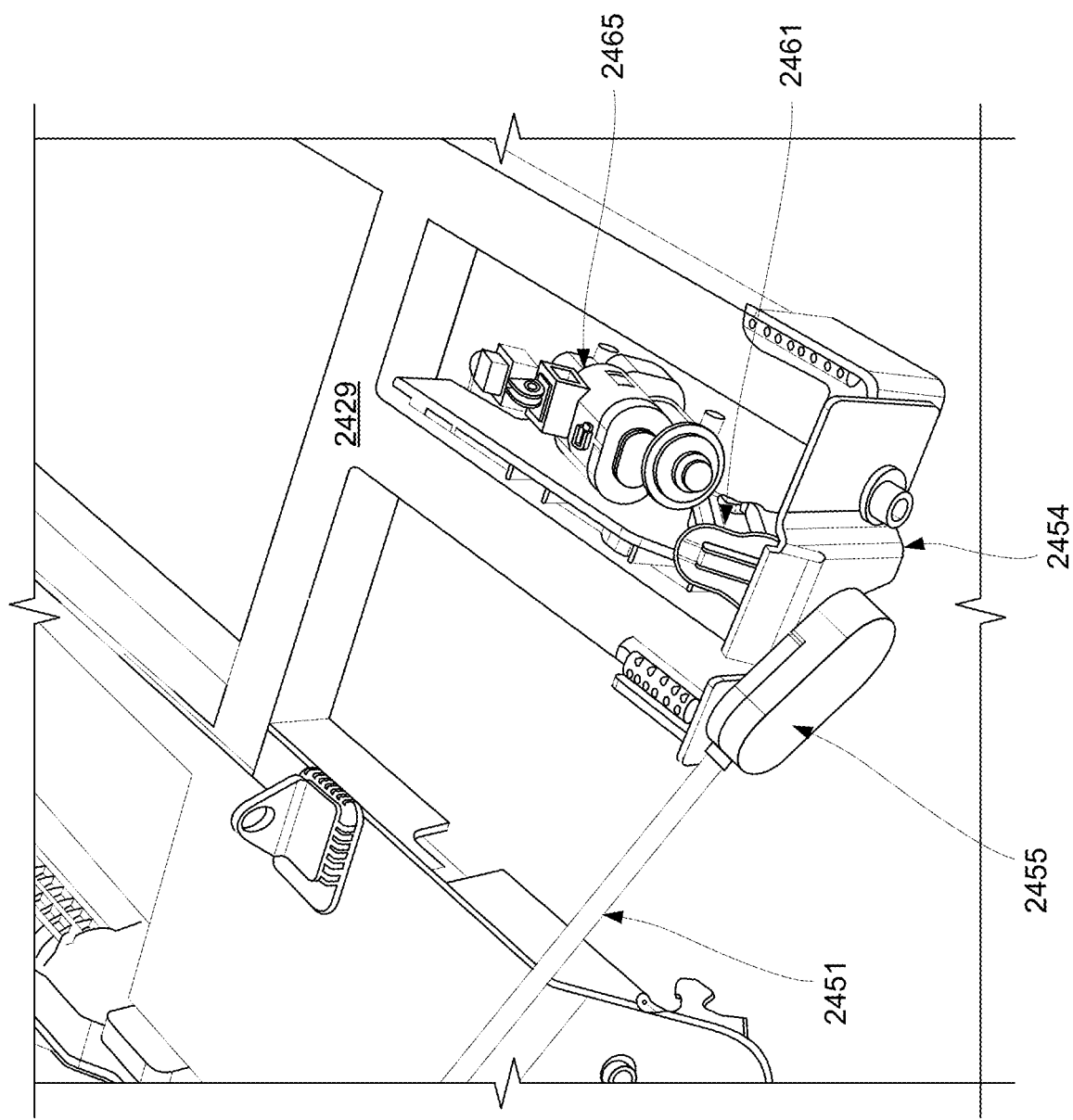
FIG. 26 shows a rear perspective view of the illustrative cable mechanism of FIGS. 24-25, with the tailgate in the 90° position, in accordance with some embodiments of the present disclosure.

FIG. 26 shows a rear perspective view of the illustrative cable mechanism of FIGS. 24-25, with the tailgate in the 90° position, in accordance with some embodiments of the present disclosure. Pin 2456 (not visible in FIG. 26) is engaged with cable catch 2454, and accordingly, the tailgate tensions cable 2451 at the 90° position, and cable 2451 provides load support for the tailgate.

Figure 27:
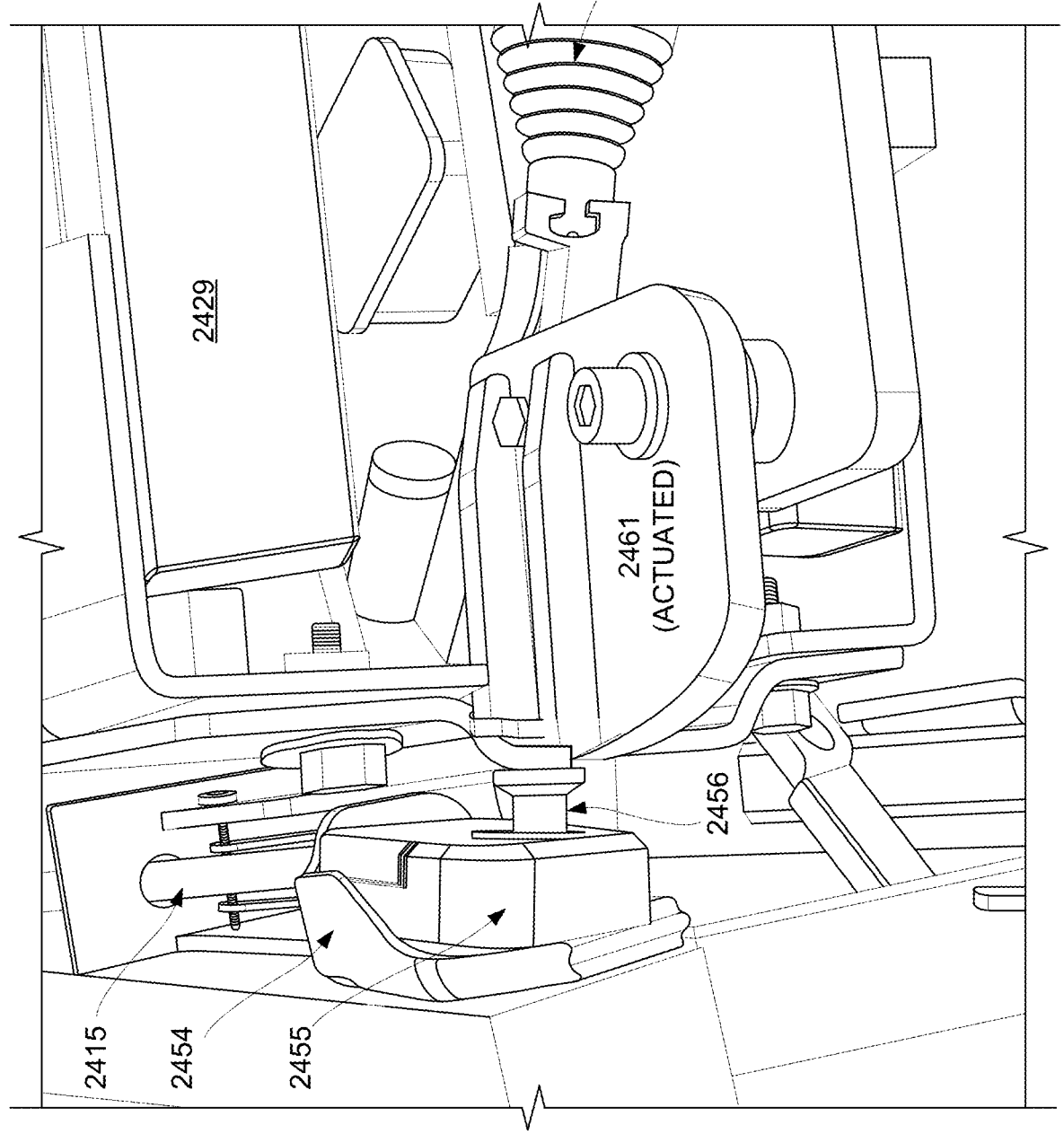
FIG. 27 shows a rear perspective view of the illustrative cable mechanism of FIGS. 24-26, with the tailgate in the closed position, and the actuator actuated, in accordance with some embodiments of the present disclosure.
Figure 28:
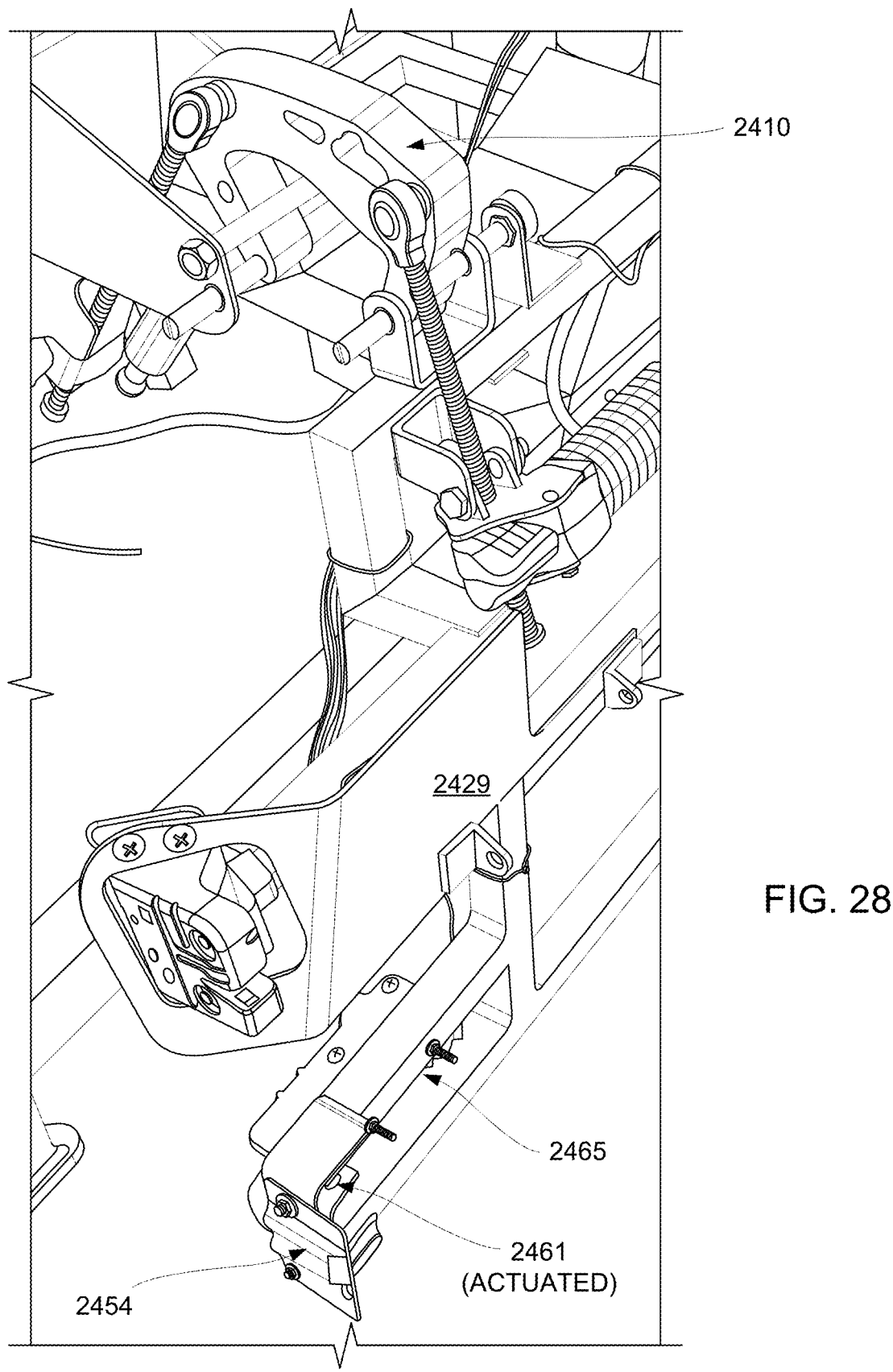
FIG. 28 shows a rear perspective view of the illustrative cable mechanism of FIGS. 24-27, with the tailgate in a 180° dropped position, and the actuator actuated, in accordance with some embodiments of the present disclosure.

FIG. 27 shows a rear perspective view of the illustrative cable mechanism of FIGS. 24-26, with the tailgate in the closed position, and actuator 2465 actuated, in accordance with some embodiments of the present disclosure. FIG. 28 shows a rear perspective view of the illustrative cable mechanism of FIGS. 24-27, with the tailgate in a 180° dropped position, and actuator 2465 actuated, in accordance with some embodiments of the present disclosure. Because cable 2451 is not coupled to the tailgate and cannot constrain its motion with rocker 2461 actuated, the tailgate achieves the 180° position. Pin 2456 is prevented from being engaged with cable catch 2454 by rocker 2461, which is actuated by actuator 2465. Accordingly, cable 2451 is not coupled to the tailgate and cannot constrain its motion with rocker 2461 actuated. Cable end 2455 is held in cable end holder 2457, as illustrated.

Figure 29:
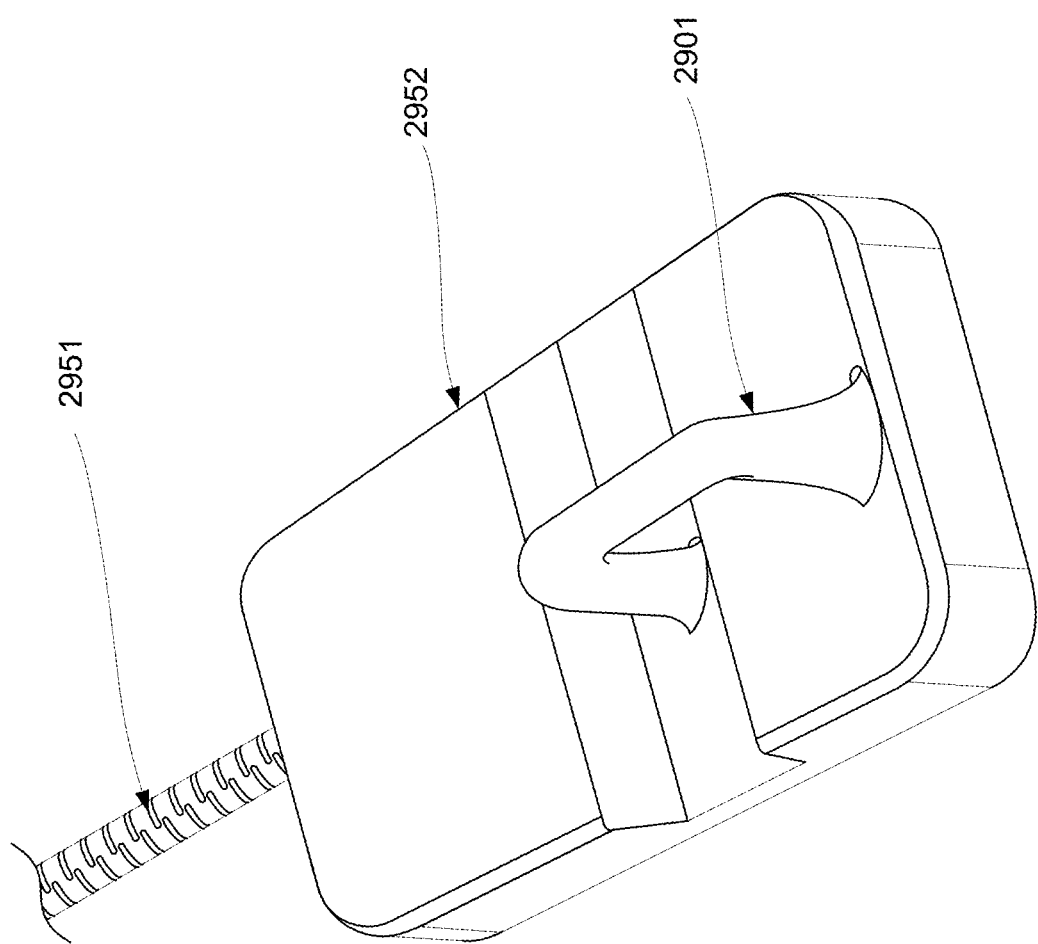
FIG. 29 shows a perspective view of an illustrative cable end, in accordance with some embodiments of the present disclosure.

FIG. 29 shows a perspective view of illustrative cable end 2952, in accordance with some embodiments of the present disclosure. Cable end 2952 includes loop 2901 that may engage with a mechanism of a tailgate to allow cable 2951 to constrain the tailgate. Further, loop 2901 may be prevented from engaging the mechanism (e.g., by an actuator and corresponding mechanism), to prevent cable 2951 from constraining motion of the tailgate. In an illustrative example, loop 2901 may perform a similar function to pin 2456 of FIGS. 24-28. In an illustrative example, loop 2901 may engage with a clamping structure that may include a hook or other catch to secure loop 2901 (e.g., with or without a cinching mechanism).

Figure 30:
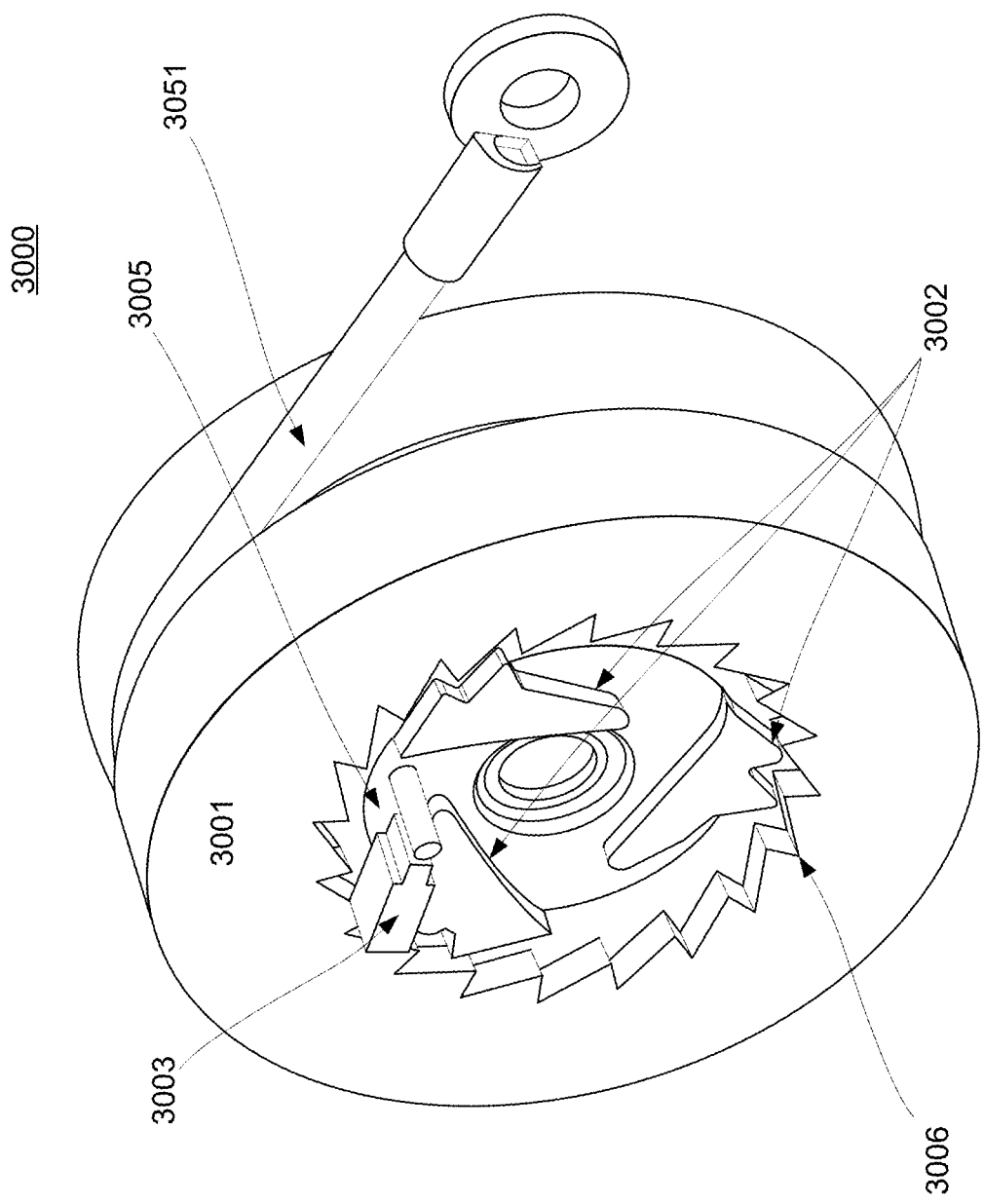
FIG. 30 shows a perspective view of the illustrative winch assembly, in accordance with some embodiments of the present disclosure.

FIG. 30 shows a perspective view of illustrative winch assembly 3000 (e.g., winch-and-cable mechanism 350 of FIGS. 3-4), in accordance with some embodiments of the present disclosure. Assembly 3000 includes winch 3005 wound with a cable spool (e.g., wound cable 3051). The assembly includes base plate 3001 and grooved sliders 3002 to achieve the 90° and 180° positions. As illustrated, solenoid actuator 3003 is included to aid in controlling motion of a tailgate coupled to cable 3051. For example, solenoid 3003 may, when actuated, change the groove engagement of grooved sliders 3002 and the winch body (e.g., the teeth would be covered by base plate 3001). The winch assembly may be used to release and wind cable 3051 during motion of the tailgate. Grooved sliders 3002 are configured to engage with teeth 3006 to lock winch assembly 3000 at a particular angular position, thus providing an angled detent. For example, cable 3051, and thus the tailgate, can achieve discreet positions/configurations based on discreet teeth 3006 (e.g., each tooth represents a length of cable 3051 and/or tailgate position). For example, teeth 3006 and grooved sliders 3002 may be used to lock the tailgate in a 90° position or any other position in the discreet set of positions. In some embodiments, solenoid 3003 is controlled by control circuitry (e.g., as one of actuator 3120 of FIG. 31) and can be responsive to user input (e.g., to open to 90° or 180°). In some embodiments, a user input may be received to lock the position of the tailgate and the control circuitry may control winch assembly 3000 to lock the position at any desired angle. For example, the position of the tailgate may be locked at approximately 135° to make a partial ramp to assist loading and unloading items from the cargo bed of the vehicle (e.g., a motorcycle or quad).

Figure 31:
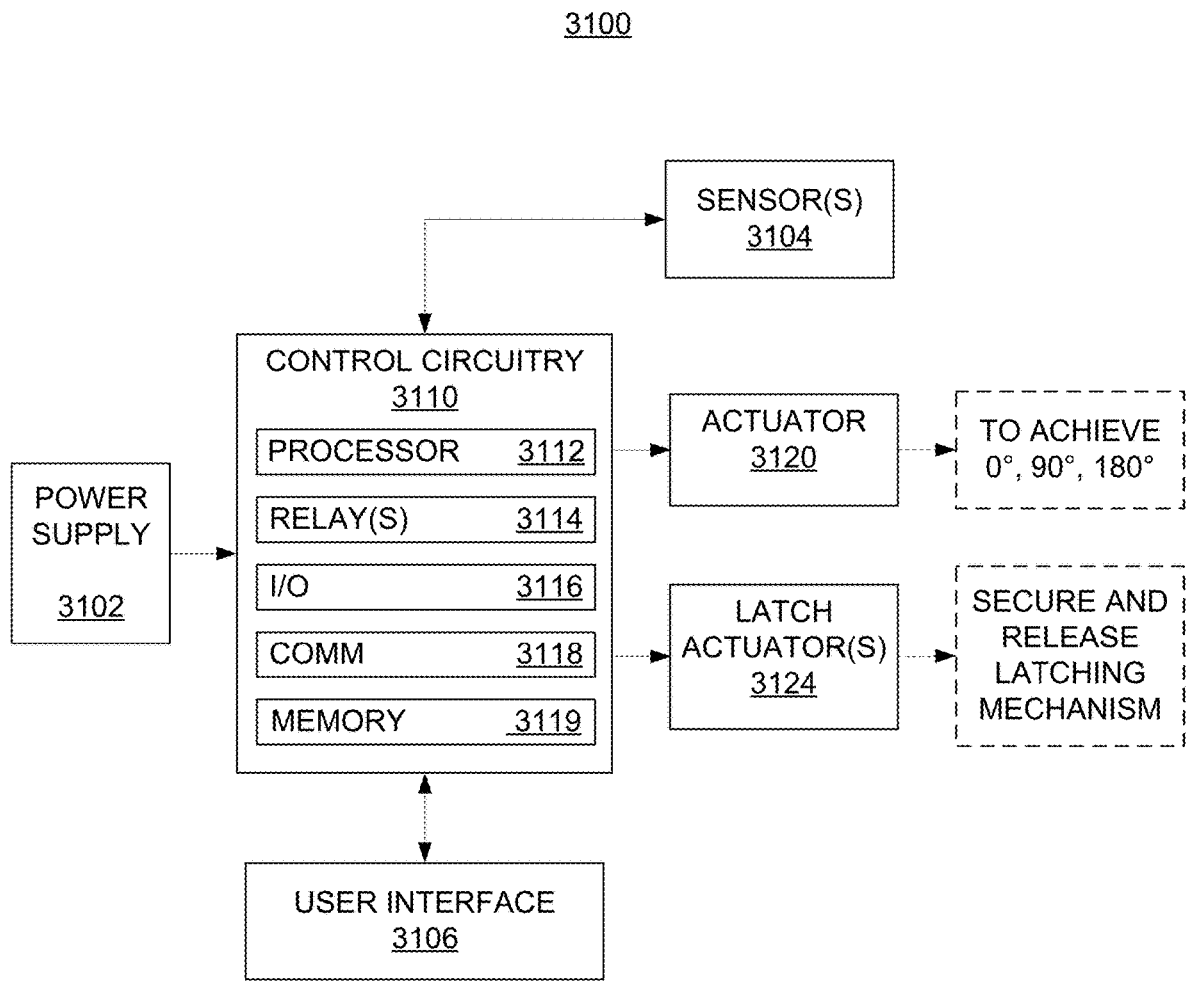
FIG. 31 shows a system diagram of an illustrative system including control circuitry, actuators, sensors, and a power supply, in accordance with some embodiments of the present disclosure.

FIG. 31 shows a system diagram of illustrative system 3100 including control circuitry 3110, actuators 3120, latch actuators 3124, sensors 3104, user interface 3106, and power supply 3102, in accordance with some embodiments of the present disclosure. Illustrative control circuitry 3110 includes processor 3112, one or more relays 3114 (hereinafter referred to as relay(s) 3114), input/output 3116 (hereinafter referred to as I/O 3116), communication hardware 3118 (hereinafter referred to as COMM 3118), and memory 3119.

Control circuitry 3110 may include hardware, software, or both, implemented on one or more modules configured to provide control of a tailgate assembly. In some embodiments, processor 3112 includes one or more microprocessors, microcontrollers, digital signal processors, programmable logic devices, field-programmable gate arrays (FPGAs), application-specific integrated circuits (ASICs), or any suitable combination thereof. In some embodiments, processor 3112 is distributed across more than one processor or processing units. In some embodiments, control circuitry 3110 executes instructions stored in memory for managing a motion of the tailgate. In some embodiments, memory 3119 is an electronic storage device that is part of control circuitry 3110. For example, memory may be configured to store electronic data, computer instructions, applications, firmware, or any other suitable information. In some embodiments, memory 3119 includes random-access memory, read-only memory, hard drives, optical drives, solid state devices, or any other suitable memory storage devices, or any combination thereof. For example, memory may be used to launch a start-up routine.

In some embodiments, control circuitry 3110 is powered by power supply 3102. In some embodiments, power supply 3102 includes a car battery (e.g., a 12 V lead acid battery), a DC-DC converter, an AC power supply (e.g., generated by suitably inverting a DC power supply), any other power supply, any corresponding components (e.g., terminals, switches, fuses, and cables), or any combination thereof. In some embodiments, power supply 3102 supplies power to actuator 3120, latch actuator(s) 3124, sensors 3104, user interface 3106, control circuitry 3110, any other suitable systems or components, or any combination thereof.

In some embodiments, user interface 3106 includes a push button, a toggle switch, a display screen (e.g., a touch screen), a key fob, a key-lock combination, any other suitable system or component for receiving input from a user or providing output to a user, or any combination thereof. In some embodiments, user interface 3106 includes a touchscreen on the dash of a vehicle, configured to receive input from the user, and provide a display to the user. In some embodiments, user interface 3106 includes one or more buttons that are selectable by a user. For example, the one or more buttons may include a button coupled to a switch, a button on a touchpad, any other suitable button that may be used by a user to make a selection, or any combination thereof. In some embodiments, a key fob includes one or more buttons, which, when pressed by a user, may provide an indication to COMM 3118 of control circuitry 3110. In some embodiments, user interface 3106 is implemented on a smartphone, tablet, or other portable device, which may communicate with control circuitry 3110 via COMM 3118. For example, a software application, or "app," may be implemented on a smartphone, with user-selectable options which may be communicated to COMM 3118 via a 3G network, WiFi, Bluetooth, or other suitable communication.

In some embodiments, sensor(s) 3104 include one or more proximity switches, limit switches, position sensors, current sensors, voltage sensors, torque sensors, haptic sensors, any other suitable sensors, or any combination thereof. For example, sensor(s) 3104 may include an optical encoder, a magnetic encoder, a potentiometer, or other suitable device for determining a rotary position or speed. In a further example, sensor(s) 3104 may include a current sensor configured to measure current provided to one or more actuators (e.g., actuator 3120, or latch actuator(s) 3124).

In some embodiments, actuator 3120 includes, or is accompanied by, a rotary actuator (e.g., an AC motor, or a DC motor), a linear actuator (e.g., an electric solenoid, rotary-threaded screw actuator, hydraulic actuator, or a pneumatic actuator), a brake, a clutch, a transmission (e.g., geared or belt-driven), a counterweight, a rotation element (e.g., a torsion spring or damper), any other suitable hardware, or any combination thereof. For example, actuator 3120 may include a stepper motor, a servo motor, an induction motor, or other type of motor. In a further example, actuator 3120 may include a DC motor and a gear drive (e.g., helical gears, spur gears, worm gears, rack and pinion gears). In a further example, actuator 3120 may include a brake to generate friction to control motion. In an illustrative example, actuator 3120 may include actuators 780 and 781 of FIG. 7, actuator 1080 of FIG. 10, actuators 1280 and 1281 of FIG. 12, actuators 1680 and 1681 of FIG. 16, actuator 1980 of FIG. 19, actuator 2181 of FIG. 21, actuator 2465 of FIG. 24, any other suitable actuator, or any suitable combination thereof. In some embodiments, actuator 3120 is coupled to, or includes as part of itself, one or more links of a linkage coupling the tailgate to the vehicle.

In some embodiments, latch actuator(s) 3124 includes, or is accompanied by, a rotary actuator (e.g., an AC motor, or a DC motor), a linear actuator (e.g., an electric solenoid, hydraulic actuator, or a pneumatic actuator), a brake, a clutch, a transmission (e.g., geared or belt-driven), a lock, a latch, a cable, any other suitable hardware, or any combination thereof. In some embodiments, a plurality of latch actuator(s) 3124 may be included to, for example, secure both sides of a tailgate to a vehicle, cinch both sides of a tailgate to a vehicle, or both.

In some embodiments, for example, latch actuator(s) 3124 includes one or more actuators configured to secure and release a latch mechanism (e.g., to secure and release the tailgate to the vehicle). In an illustrative example, latch actuator(s) 3124 may include latch actuators 1071 of FIG. 10, latch actuators 1271 of FIG. 12, any other suitable latch actuators, or any suitable combination thereof.

Illustrative system 3100 of FIG. 31 may be used to control any of the tailgate assemblies disclosed herein, in accordance with the present disclosure. In some embodiments, not all components shown in FIG. 31 need be included in system 3100. For example, in some embodiments, no actuator 3120 is included, and the tailgate is moved based on manual input (e.g., forces generated by a user). In a further example, in some embodiments, no latch actuator 3124 is included, and latches are secured and released manually by a user. In a further example, in some embodiments, user interface 3106 includes only electrical switches, and control circuitry 3110 includes only relays 3114, which provide power from power supply 3102 to actuator 3120, latch actuator(s) 3124, or both, based on positions of the electrical switches. In a further example, system 3100 need not include sensor(s) 3104. In some embodiments, a tailgate assembly operates completely under manual control, and system 3100 is not needed to achieve a 90° or 180° position.

Figure 32:
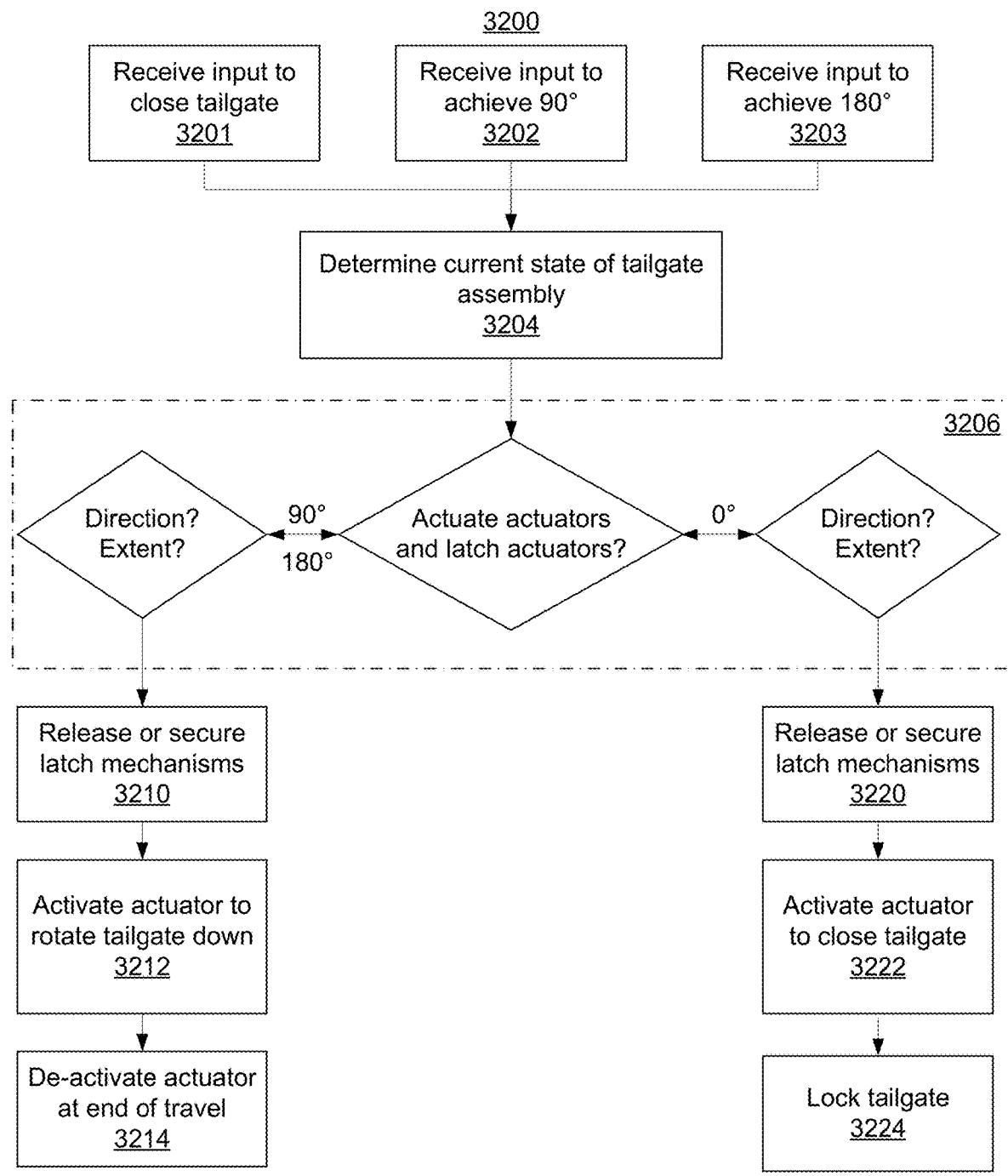
FIG. 32 is a flowchart of an illustrative process for managing motion of a tailgate assembly, in accordance with some embodiments of the disclosure.

FIG. 32 is a flowchart of illustrative process 3200 for managing motion of a tailgate assembly, in accordance with some embodiments of the disclosure. It should be noted that process 3200 or any step thereof could be performed on, or provided by, system 3100 of FIG. 31. In addition, one or more steps of process 3200 may be incorporated into or combined with one or more other steps described herein.

Step 3201 includes control circuitry receiving an input to actuate the tailgate to 0° (i.e., the closed position). The input may include, for example, an indication of a pressed button, a selection by a user, a signal from a key fob, an input to an interface of a software application (e.g., on a vehicle interface, dash interface, or mobile device), any other suitable input, or any combination thereof. In some embodiments, the control circuitry receives the input to actuate the actuator for moving the tailgate as a signal at one or more I/O pins of the control circuitry.

Step 3202 includes control circuitry receiving an input to actuate the tailgate to 90°. The input may include, for example, an indication of a pressed button, a selection by a user, a signal from a key fob, an input to an interface of a software application (e.g., on a vehicle interface, dash interface, or mobile device), any other suitable input, or any combination thereof. In some embodiments, the control circuitry receives the input to actuate the actuator for moving the tailgate as a signal at one or more I/O pins of the control circuitry.

Step 3203 includes control circuitry receiving an input to actuate the tailgate to 180°. The input may include, for example, an indication of a pressed button, a selection by a user, a signal from a key fob, an input to an interface of a software application (e.g., on a vehicle interface, dash interface, or mobile device), any other suitable input, or any combination thereof. In some embodiments, the control circuitry receives the input to actuate the actuator for moving the tailgate as a signal at one or more I/O pins of the control circuitry.

Step 3204 includes control circuitry determining a current state of the tailgate assembly, or portion thereof. A current state of the tailgate assembly may include, for example, a position of a tailgate, direction of motion of a tailgate, state of one or more latches (e.g., open or closed, released or secured), state of an actuator, state of a cinch actuator, position of a linkage such as a hinge arm (e.g., an angular position about a rotational axis as measured by an encoder), state of a latch, any other suitable state that the tailgate assembly or portion thereof is in, or any combination thereof. For example, one or more electrical switches or contacts may be configured to indicate when the tailgate is secured to the vehicle (e.g., in a closed position). In some embodiments, the control circuitry receives input from one or more sensors to indicate the current state of the tailgate assembly or portion thereof. For example, one or more proximity sensors may indicate whether the tailgate is closed. In some embodiments, the control circuitry performs a safety check (e.g., that latches are in a safe, or predetermined, position); a system check (e.g., that the battery has sufficient voltage or power, or that a fuse is intact); or other diagnostic (e.g., a check that a key is in the auxiliary position or ON position) to determine the current state of the tailgate assembly.

Step 3206 includes control circuitry determining which motion of the tailgate to actuate based on a received input (e.g., input from steps 3201, 3202, or 3203). In some embodiments, the control circuitry determines whether to, and how to, actuate the tailgate based on a current state of the tailgate assembly (e.g., determined at step 3204), or a portion of the tailgate assembly thereof, based on a received input (e.g., from steps 3201, 3202, or 3203), based on any other suitable information, or based on any combination thereof. In some embodiments, the control circuitry determines whether to and how to actuate one or more actuators based on a predetermined table, database, or other information. For example, the state of each latch mechanism, and the state of one or more links (e.g., a hinge arm) that are a safe starting point to actuate a motion may be included in a database or table. If the control circuitry determines that the current state of the tailgate assembly corresponds to a safe state, then the control circuitry may determine whether to actuate a lowering motion, a raising motion, or no motion (e.g., if it is determined that no motion is safe, appropriate, or available to achieve).

In some embodiments, the control circuitry determines that no motion is to be actuated at step 3206. For example, the control circuitry may determine that no motion is to be performed if no power is available, the tailgate assembly is not ready to undergo a motion (e.g., a latch state is unknown, the actuator is shorted, a user has not unlocked the tailgate), no usable input is received (e.g., an error such as a user selecting to 180° when the tailgate is already at 180°), any other suitable criterion, or any combination thereof.

Step 3206 include control circuitry determining in which direction to actuate the one or more actuators (e.g., clockwise or counterclockwise, up or down, forward or backward). In some embodiments, the direction is indicated by which button is pressed (e.g., up and down buttons, a double throw toggle switch), which option is selected (e.g., a button on a key fob pressed by a user, a soft button on a touchscreen), or both. In some embodiments, the control circuitry determines the direction based on input received from a sensor. For example, if the tailgate assembly is in a closed position as determined by a proximity switch, the control circuitry may determine to rotate the tailgate assembly down (e.g., to open the tailgate assembly and provide access to a vehicle bed). In some embodiments, the control circuitry determines in which direction to cause rotation based on the current state of the tailgate assembly. For example, the control circuitry may determine the current state to be that the tailgate assembly is fully dropped to 180° based on a limit switch, and accordingly, the control circuitry may determine to cause rotation upwards (e.g., to close the tailgate assembly or bring to 90°).

Step 3210 includes control circuitry releasing one or more latch mechanisms. In some embodiments, control circuitry sends a signal to secure or release one or more latch actuators, latch mechanisms, or both. For example, the control circuitry may activate a relay to provide fused 12 V battery power to secure or release a latch mechanism. In a further example, the control circuitry may provide 12 V battery power to secure or release a cinch actuator securing a latch mechanism (e.g., thereby preventing or allowing at least one motion). If one or more latch mechanisms are already secured or released (e.g., manually secured or released by a user, or otherwise already in the required state), as intended, step 3210 need not be performed.

Step 3212 includes control circuitry activating an actuator, actuating one or more linkages, to rotate the tailgate up or down, based on a determination at step 3206. In some embodiments, the control circuitry applies power to the actuator by applying voltage to suitable pins of a relay (e.g., applying 12 V across the control pins), wherein suitable pins of the relay (e.g., +12 V power and ground) are wired to the actuator. In some embodiments, the control circuitry generates a relatively low voltage and/or current control signal (e.g., 3.3 VDC, 5 VDC, 4-20 mA, a 5V pulse, or a 5 V PWM) to activate a relay (e.g., a mechanical relay, or a solid-state relay), a contactor, a transistor, any other suitable power electronics or components, or any combination thereof. In some embodiments, the control circuitry generates a signal that is based at least in part on the determined direction of step 3206. For example, in some configurations, a relative polarity of two pins may change based on which direction the motion is to be in.

In some embodiments, control circuitry determines not to perform step 3210, step 3212, or both. For example, if the tailgate is already at 90°, then the control circuitry may determine not to perform step 3210, step 3212, or both (e.g., to prevent a damaging or dangerous configuration). In some embodiments, the control circuitry, for example, first suitably actuates the tailgate assembly, or components thereof (e.g., a tailgate), to a fully closed position before activating the actuator to rotate the tailgate down (e.g., achieve a known safe or reference configuration and then proceed the desired configuration).

Step 3214 includes control circuitry de-activating the actuator at an end of travel (e.g., the tailgate has dropped down fully). In some embodiments, a limit switch, a proximity switch, an electrical contact, an optical switch, an optical proximity sensor, a magnetic proximity sensor, a position encoder, or any other suitable indicator provides an indication that an end of travel has been achieved. In some embodiments, the control circuitry monitors the current draw, torque, impedance, or other values corresponding to the actuator and de-activates the actuator based on the monitoring. For example, as the tailgate reaches an end of travel, the actuator may become more loaded as it actuates one or more linkages (e.g., a hinge arm) connected to the tailgate. Accordingly, the current draw increases and the control circuitry may detect the increase and deactivate the actuator (e.g., remove power from suitable pins of a relay to shut off power to the actuator). In some embodiments, the control circuitry deactivates the actuator at the end of travel, and correspondingly secures a latch (e.g., a cinch actuator coupled to a latch mechanism) to lock the tailgate in position. An end of travel includes an intended stopping position (e.g., tailgate assembly fully dropped to 180°), an intermediate position (e.g., based on a user input to stop by pressing a button, or a detent), any other suitable stopping position, or any combination thereof. For example, if the control circuitry detects a hindrance to rotation (e.g., a user is in the way, or some object is blocking the tailgate assembly, and actuator current increases), then the instant position may be determined to be the end of travel. In a further example, the control circuitry may detect an impact from a rotational position encoder (e.g., based on processing of the encoder signal) and accordingly determine the position of impact as the end of travel. In a further example, a cable, mechanical hard stop, or a detent may be used to more explicitly define the end of travel.

Step 3220 includes control circuitry releasing one or more latch mechanisms. In some embodiments, control circuitry sends a signal to secure or release one or more latch actuators, latch mechanisms, or both. For example, the control circuitry may activate a relay to provide fused 12 V battery power to secure or release a latch mechanism. In a further example, the control circuitry may provide 12 V battery power to secure or release a cinch actuator securing a latch mechanism (e.g., thereby preventing or allowing at least one motion). If one or more latch mechanisms are already secured or released (e.g., manually secured or released by a user, or otherwise already in the required state), as intended, step 3210 need not be performed. In some embodiments, step 3220 need not be performed. For example, the tailgate need not be latched at the 90° or 180° positions, and accordingly, no latch need be secured or released. In a further example, a tailgate, latch mechanism, or any other suitable mechanism may include components, features, or actuators to mechanically lock a tailgate in a lowered position, which may need to be released to raise the tailgate.

Step 3222 includes control circuitry activating an actuator to actuate the tailgate up, based on a determination at step 3206. In some embodiments, the control circuitry applies power to the actuator by applying voltage to suitable pins of a relay (e.g., applying 12 V across the control pins), wherein suitable pins of the relay (e.g., +12 V power and ground) are wired to the actuator. In some embodiments, the control circuitry generates a relatively low voltage and/or current control signal (e.g., 3.3 VDC, 5 VDC, 4-20 mA, a 5V pulse, or a 5 V PWM) to activate a relay (e.g., a mechanical relay, or a solid-state relay), a contactor, a transistor, any other suitable power electronics or components, or any combination thereof. In some embodiments, the control circuitry generates a signal that is based at least in part on the determined direction of step 3206. For example, a relative polarity of two pins may change based on which direction the motion is to be in.

In some circumstances, control circuitry may determine not to perform step 3220, step 3222, or both. For example, if the tailgate assembly is already fully closed, then the control circuitry may determine not to perform step 3220, step 3222, or both (e.g., to prevent a damaging or dangerous configuration).

Step 3224 includes control circuitry locking the tailgate assembly in a closed position (e.g., at 0°). In some embodiments, a limit switch, a proximity switch, an electrical contact, an optical switch, an optical proximity sensor, a magnetic proximity sensor, a position encoder, or any other suitable indicator provides an indication that the end of travel has been achieved, and the tailgate assembly may be locked in place. In some embodiments, the control circuitry activates a cinch actuator to lock the tailgate in position. In some embodiments, the control circuitry secures a latch mechanism to lock the tailgate assembly in place. In some circumstances, if the tailgate assembly is unable to close completely (e.g., something is blocking the rotation motion), the control circuitry need not perform step 3224.

It is contemplated that the steps or descriptions of FIG. 32 may be used with any other embodiments of this disclosure. In addition, the steps and descriptions described in relation to FIG. 32 may be done in alternative orders or in parallel to further the purposes of this disclosure. As another example, each of these steps may be performed in any suitable order or in parallel or substantially simultaneously to reduce lag or increase the speed of the system or method. Any of these steps may also be skipped or omitted from the process. In some embodiments, one or more steps may be performed by a user, and accordingly, need not be performed by control circuitry.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A tailgate assembly of a vehicle, the tailgate assembly comprising:
   a tailgate configured to provide a boundary of a cargo area; and
   a hinge assembly comprising a hinge arm, wherein the hinge arm is coupled to the vehicle at a first hinge and to the tailgate at a second hinge, and wherein the hinge assembly is configured to control a trajectory of the tailgate relative to the vehicle, wherein the tailgate is configured to:
      achieve a first position, wherein the first position is a vertical closed position;
      achieve a second position, wherein the second position is a horizontal open position; and
      achieve a third position, wherein the third position is a vertical open position rotated more than 145° from the first position.

2. The tailgate assembly of claim 1, wherein:
   the hinge arm is arranged at a first angle when the tailgate achieves the first position;
   the hinge arm is arranged at a second angle when the tailgate achieves the second position; and
   the hinge arm is arranged at the second angle when the tailgate achieves the third position.

3. The tailgate assembly of claim 2, wherein when the hinge arm is arranged at the second angle and the tailgate is arranged in the third position, the hinge arm extends from the vehicle by a distance less than a height of the tailgate.

4. The tailgate assembly of claim 1, further comprising a latching mechanism configured to constrain at least one motion of the tailgate assembly.

5. The tailgate assembly of claim 4, wherein the latching mechanism is configured to, when latched, constrain the hinge arm to remain at the first angle.

6. The tailgate assembly of claim 4, wherein the latching mechanism is configured to, when latched, constrain the hinge arm to remain at the second angle.

7. The tailgate assembly of claim 1, further comprising a winch assembly comprising:
   a winch mechanism; and
   a cable coupled to the winch mechanism and coupled to the tailgate, wherein the winch mechanism is configured to wind and unwind the cable when the tailgate changes position.

8. The tailgate assembly of claim 7, wherein the winch mechanism includes an angle detent configured to define one or more positions of the tailgate.

9. The tailgate assembly of claim 1, wherein:
   when in the second position, the tailgate is substantially horizontally oriented at about 90° to vertical; and
   when in the third position, the tailgate is substantially vertically oriented and relatively upside down as compared to the first position.

10. The tailgate assembly of claim 1, further comprising a latching mechanism configured to constrain at least one motion of the tailgate assembly.

11. The tailgate assembly of claim 10, wherein the latching mechanism is configured to, when latched, constrain the tailgate to remain in the first position.

12. The tailgate assembly of claim 10, wherein the latching mechanism is configured to, when latched, constrain the tailgate to remain in the second position.

13. The tailgate assembly of claim 10, wherein the latching mechanism is configured to, when latched, constrain the tailgate to remain in the third position.

14. The tailgate assembly of claim 1, further comprising a cover plate coupled to the vehicle by a cover plate hinge, wherein:
when the tailgate achieves the first position, the cover plate is oriented nearly vertical against the tailgate; and
when the tailgate achieves the second position, the cover plate is oriented nearly horizontal arranged above the hinge assembly; and
when the tailgate achieves the third position, the cover plate is oriented nearly horizontal arranged above the hinge assembly.

15. A tailgate assembly of a vehicle, the tailgate assembly comprising:
a tailgate configured to provide a boundary of a cargo area;
a step coupled to the tailgate by a step hinge; and
a hinge assembly comprising a hinge arm, wherein the hinge arm is coupled to the vehicle at a first hinge and to the tailgate at a second hinge, and wherein the hinge assembly is configured to control a trajectory of the tailgate relative to the vehicle, wherein the tailgate is configured to:
achieve a first position, wherein the first position is a closed position,
achieve a second position rotated about 90° from the first position, and
achieve a third position rotated about 180° from the first position, wherein the step is configured to rotate relative to the tailgate about the step hinge to provide a horizontal stepping surface when the tailgate is in the third position.

16. The tailgate assembly of claim 15, wherein when the tailgate achieves the first position, the step is arranged parallel to the tailgate.

17. The tailgate assembly of claim 16, further comprising a step latch configured to constrain the step against the tailgate.

18. The tailgate assembly of claim 17, wherein the step latch, when released, allows the step to rotate 90° relative to the tailgate to provide a substantially perpendicular surface relative to the tailgate.

19. The tailgate assembly of claim 15, wherein the step is configured to move based on a gravitational force, and wherein the step is constrained to rotate about the step hinge based on the gravitational force.

20. A tailgate assembly of a vehicle, the tailgate assembly comprising:
a tailgate configured to provide a boundary of a cargo area;
a hinge assembly coupled to the tailgate and coupled to the vehicle, and configured to control a trajectory of the tailgate relative to the vehicle; and
a cable assembly that couples the tailgate to the vehicle, wherein the tailgate is configured to:
achieve a first position, wherein the first position is a vertical closed position,
achieve a second position, wherein the second position is a horizontal open position, and wherein the tailgate causes the cable assembly to be in tension, and
achieve a third position, wherein the third position is a vertical open position rotated about 180° from the first position, and wherein the tailgate does not impart a tension on the cable assembly.

21. The tailgate assembly of claim 20, wherein the cable assembly comprises:
a locking mechanism;
a cable;
a first cable end coupled to the tailgate; and
a second cable end configured to be coupled to the locking mechanism.

22. The tailgate assembly of claim 21, wherein:
when the tailgate achieves the first position, the cable is not tensioned;
when the tailgate achieves the second position, the cable is coupled to the locking mechanism in tension to hold the tailgate against gravity; and
when the tailgate achieves the third position, the cable is released from the locking mechanism and is not in tension.

23. The tailgate assembly of claim 22, further comprising a cable stop affixed to the cable, wherein the locking mechanism is configured to engage with the cable stop when the tailgate achieves the second position.

24. The tailgate assembly of claim 20, wherein the cable assembly comprises:
a locking mechanism arranged as part of the tailgate;
a cable;
a first cable end coupled to the vehicle; and
a second cable end configured to be coupled to the locking mechanism.

25. A tailgate assembly of a vehicle, the tailgate assembly comprising:
a tailgate configured to provide a boundary of a cargo area, wherein the tailgate comprises a cable mechanism;
a hinge assembly coupled to the tailgate and coupled to the vehicle, and configured to control a trajectory of the tailgate relative to the vehicle; and
a cable assembly comprising a cable and a cable end, wherein the tailgate is configured to:
achieve a first position, wherein the first position is a vertical closed position, and wherein the cable end is not engaged with the cable mechanism,
achieve a second position, wherein the second position is a horizontal open position, wherein the cable end is engaged with the cable mechanism, and wherein the tailgate causes the cable assembly to be in tension, and
achieve a third position, wherein the third position is a vertical open position rotated about 180° from the first position, wherein the cable end is not engaged with the cable mechanism, and wherein the tailgate does not impart a tension on the cable assembly.

* * * * *